US 009904652 B2

(12) United States Patent
Sthoeger et al.

(10) Patent No.: US 9,904,652 B2
(45) Date of Patent: Feb. 27, 2018

(54) SYSTEM AND METHOD OF SENDING DATA VIA ADDITIONAL SECONDARY DATA LINES ON A BUS

(71) Applicant: QUALCOMM Incorporated, San Diego, CA (US)

(72) Inventors: Gilad Sthoeger, Eshchar (IL); Michael Zilberstein, Yokneam Moshava (IL); Alexander Khazin, Nesher (IL); Ben Levin, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 14/535,992

(22) Filed: Nov. 7, 2014

(65) Prior Publication Data

US 2015/0134862 A1 May 14, 2015

Related U.S. Application Data

(60) Provisional application No. 61/904,133, filed on Nov. 14, 2013.

(51) Int. Cl.
*G06F 13/42* (2006.01)
*G06F 1/12* (2006.01)

(52) U.S. Cl.
CPC .......... *G06F 13/4282* (2013.01); *G06F 1/12* (2013.01); *G06F 13/423* (2013.01);
(Continued)

(58) Field of Classification Search
CPC ............... G06F 13/423; G06F 13/4282; G06F 13/4291; G06F 1/12; Y02B 60/1228; Y02B 60/1235
See application file for complete search history.

(56) References Cited

U.S. PATENT DOCUMENTS 7,197,591 B2 * 3/2007 Kwa ............... G06F 1/3203
326/86
7,370,132 B1 * 5/2008 Huang ............ G06F 13/4018
710/305
(Continued)

OTHER PUBLICATIONS

International Search Report and Written Opinion—PCT/US2014/064864—ISA/EPO—dated Jan. 26, 2015.
(Continued)

*Primary Examiner* — Eric Oberly
(74) *Attorney, Agent, or Firm* — Loza & Loza LLP

(57) ABSTRACT

A serial low-power inter-chip media bus communications link is deployed in apparatus having multiple Integrated Circuit devices. Communications capabilities of a device coupled to the communications link may be determined and configuration or framing message may be sent to the first device based on the capabilities. The messages may be transmitted on a primary data line of the communications link with a clock used to control timing of transmission on at least the primary data line. The communications capabilities can include information identifying a number of data wires supported by or coupled to the device. A first device may be configured to communicate with a second device over a secondary data line, which may be reserved for such direct communication. Communications on the secondary data line may be synchronized using the clock signal and may be controlled by a different protocol than the protocol used for the primary data line.

30 Claims, 14 Drawing Sheets

(52) U.S. Cl.
CPC ...... *G06F 13/4291* (2013.01); *Y02B 60/1228* (2013.01); *Y02B 60/1235* (2013.01)

(56) References Cited

U.S. PATENT DOCUMENTS

| | | | | |
|---|---|---|---|---|
| 2010/0077157 A1* | 3/2010 | Gregorius | ........... | G06F 13/1605 711/149 |
| 2010/0189112 A1* | 7/2010 | Nakata | .................. | H04L 1/1887 370/400 |
| 2010/0191995 A1* | 7/2010 | Levy | ..................... | G06F 1/3209 713/323 |
| 2013/0019038 A1* | 1/2013 | Gruber | .............. | H04L 12/40013 710/105 |
| 2013/0156044 A1* | 6/2013 | Gruber | ................ | G06F 13/4291 370/438 |

OTHER PUBLICATIONS

Juha B., et al.,"Slimbus: An Audio, Data and Control Interface for Mobile Devices", AES 29th International Conference an Audio for Mobile and Handheld Devices, Sep. 2006, 60 East 42nd Street, Room 2520, New York 10165-2520, USA, Sep. 1, 2006 (Sep. 1, 2006), XP040507958, pp. 1-10, Section 2.6.

* cited by examiner

SYSTEM AND METHOD OF SENDING DATA VIA ADDITIONAL SECONDARY DATA LINES ON A BUS

CROSS-REFERENCE TO RELATED APPLICATIONS

The present application for patent claims priority to Provisional Application No. App. No. 61/904,133, entitled "System And Method Of Sending Data Via Additional Secondary Data Lines On A Bus"filed Nov. 14, 2013, which is assigned to the assignee hereof and hereby expressly incorporated by reference herein.

BACKGROUND

Field

The present disclosure relates generally to data communications interfaces, and more particularly, to data communications links provided between multiple devices.

Background

Manufacturers of mobile devices, such as cellular phones, may obtain components of the mobile devices from various sources, including different manufacturers. For example, an application processor in a cellular phone may be obtained from a first manufacturer, while the display for the cellular phone may be obtained from a second manufacturer. The application processor and a display or other device may be interconnected using a standards-based or proprietary physical interface.

In one example, the serial low-power inter-chip media bus (SLIMbus) standard is a communication bus standard that is well-suited for use in portable computing devices such as mobile phones. In accordance with the SLIMbus standard, components may be connected by a single SLIMbus data line and a single clock line. However, new generations of devices attached to a SLIMbus require ever-increasing bandwidth and throughput for applications that process and communicate audio and video data.

Accordingly, there is a need to increase communication bandwidths available between components of mobile devices and other apparatus.

SUMMARY

Embodiments disclosed herein provide systems, methods and apparatus that can improve the operation of SLIMbus communications links. The communications link may be deployed in apparatus such as a mobile terminal having multiple Integrated Circuit (IC) devices.

In certain aspects of the disclosure, a data communications method includes determining communications capabilities of a first device coupled to a SLIMbus, sending a configuration message to the first device over a primary data line of the SLIMbus, and providing a clock signal that controls timing of transmission on at least the primary data line. The communications capabilities may include information identifying a number of data wires supported by or coupled to the device. The configuration message may cause the first device to be configured for communication with a second device over a secondary data line. The first device may be configured to communicate with the second device using a SLIMbus protocol. The first device may be configured to communicate with the second device using a non-SLIMbus protocol. The secondary data line may connect the first device with the second device independently of the SLIMbus. Communications on the secondary data line may be synchronized using the clock signal. The configuration message may include a framing message.

In one aspect, the method may include allocating a plurality of communications channels in time slots on both the primary data line and the secondary data line data. The first device may communicate with the second device using one of the plurality of communications channels.

In one aspect, the configuration message includes control information reserving the secondary data line for communications between the first device and the second device. The secondary data line may be one of a plurality of secondary data lines of the SLIMbus. The control information may be generated by a SLIMbus manager provided on a third device. The third device may be restricted to communicating over the primary data line.

In one aspect, the method includes sending configuration messages over the primary data line to a plurality of devices, and transmitting a reconfiguration command to the one or more devices. The reconfiguration command may cause each of the plurality of devices to adopt a configuration in accordance with at least one configuration message. At least one configuration message sent over the primary data line may be addressed to a predefined set of devices. The first device may be configured to relay at least one configuration message sent over the primary data line to a third device.

In certain aspects of the disclosure, an apparatus includes means for determining communications capabilities of a first device coupled to a SLIMbus, means for sending configuration and framing messages to the first device over a primary data line of the SLIMbus, and means for providing a clock signal that controls timing of transmission on at least the primary data line. The communications capabilities may identify a number of data wires coupled to the device. The first device may be configured to communicate with a second device over a secondary data line.

In certain aspects of the disclosure, an apparatus includes a processing circuit configured to determine communications capabilities of a first device coupled to a SLIMbus, send a configuration message and/or a framing message to the first device over a primary data line of the SLIMbus, and provide a clock signal that controls timing of transmission on at least the primary data line. The communications capabilities may identify a number of data wires coupled to the device. The first device may be configured to communicate with a second device over a secondary data line.

In certain aspects of the disclosure, a processor-readable storage medium may be encoded with one or more instructions which, when executed by at least one processing circuit, cause the at least one processing circuit to determine communications capabilities of a first device coupled to a SLIMbus, send a configuration message and/or a framing message to the first device over a primary data line of the SLIMbus, and provide a clock signal that controls timing of transmission on at least the primary data line. The communications capabilities may identify a number of data wires coupled to the device. The first device may be configured to communicate with a second device over a secondary data line.

In certain aspects of the disclosure, a communications method includes receiving one or more configuration messages from a SLIMbus primary data line, reconfiguring a communications interface in based on the one or more configuration messages and in response to a reconfiguration command, and communicating with a first device over a first data line while communicating with a second device over a second data line. The second data line may be reserved for communications with the second device. The first data line may include the SLIMbus primary data line or a SLIMbus secondary data line. The second data line may be a SLIMbus secondary data line that employs a framing and control configuration used by the SLIMbus primary data line. The framing and control configuration may define a root clock frequency. The framing and control configuration may define gearing and is used to calculate a frame boundary. In some instances, communications on the second data line may be controlled by a non-SLIMbus protocol.

In one aspect, the method may include reporting communications capabilities information to a manager device. The configuration messages may be generated in response to the communications capabilities information.

In certain aspects of the disclosure, an apparatus includes means for receiving one or more configuration messages from a SLIMbus primary data line, means for reconfiguring a communications interface based on the one or more configuration messages and in response to a reconfiguration command, and means for communicating with a first device over a first data line while communicating with a second device over a second data line. The second data line may be reserved for communications with the second device.

In certain aspects of the disclosure, an apparatus includes a processing circuit configured to receive one or more configuration messages from a SLIMbus primary data line, reconfigure a communications interface based on the one or more configuration messages and in response to a reconfiguration command, and communicate with a first device over a first data line while communicating with a second device over a second data line. The second data line may be reserved for communications with the second device.

In certain aspects of the disclosure, a processor-readable storage medium stores or maintains one or more instructions. The instructions may be executed by at least one processing circuit and may cause the at least one processing circuit to receive one or more configuration messages from a SLIMbus primary data line, reconfigure a communications interface based on the one or more configuration messages and in response to a reconfiguration command, and communicate with a first device over a first data line while communicating with a second device over a second data line. The second data line may be reserved for communications with the second device.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Figure 1:
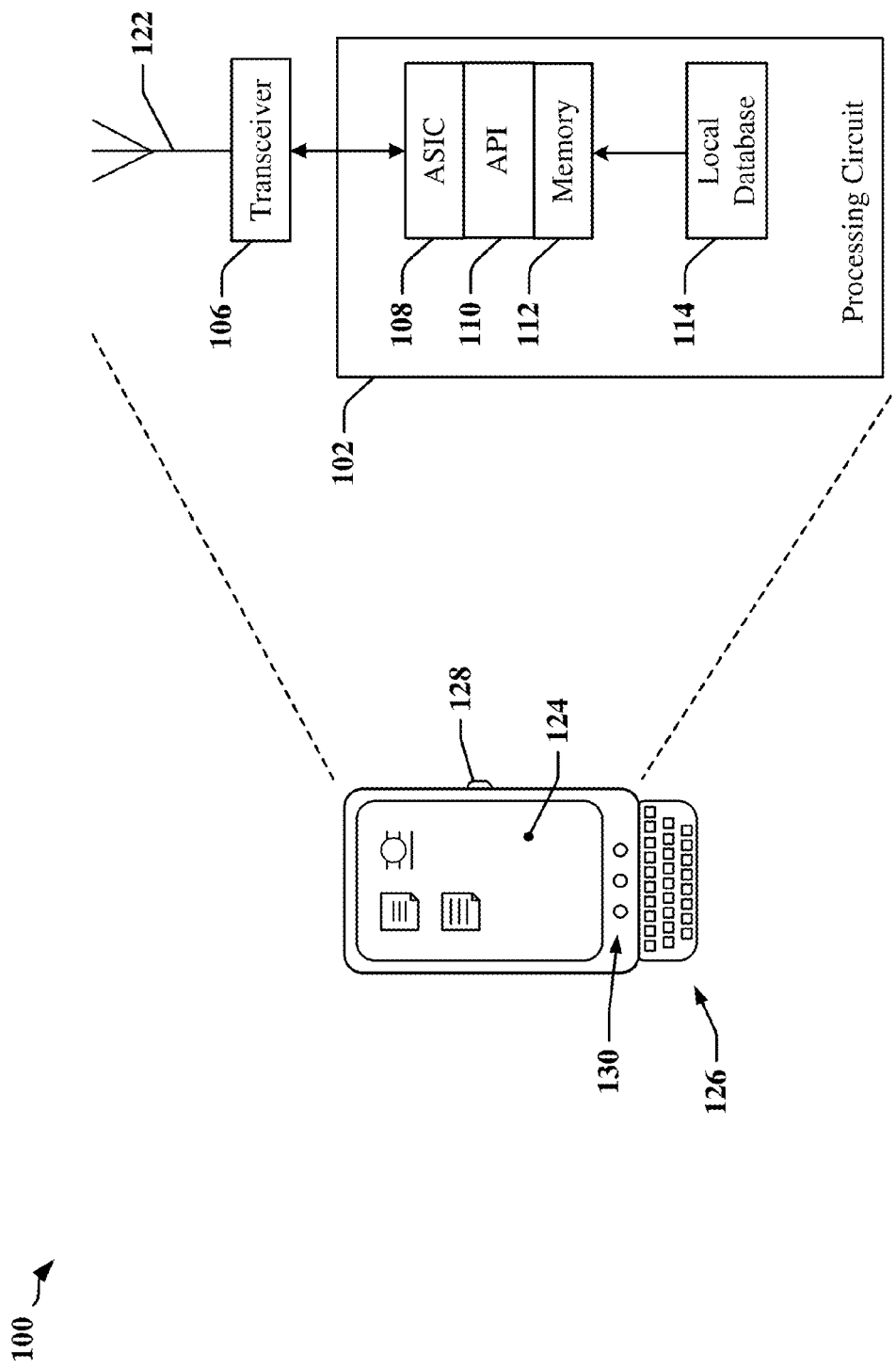
FIG. 1 depicts an apparatus employing a data link between IC devices that selectively operates according to one of a plurality of available standards.

Certain aspects of the invention may be applicable to communications links deployed between electronic devices that may include subcomponents of an apparatus such as a telephone, a mobile computing device, a wearable computing device, a media player, a gaming device, an appliance, automobile electronics, avionics systems, etc. FIG. 1 illustrates one example of a wireless communications device 100 that may employ a communications link between IC devices. In one example, the wireless communications device 100 may include a wireless communication device that communicates through an RF interface with a radio access network, a core access network, the Internet and/or another network. The wireless communications device 100 may include a communications transceiver 106 operably coupled to a processing circuit 102. The processing circuit 102 may include one or more IC devices, such as an application-specific IC (ASIC) 108. The ASIC 108 may include one or more processing devices, logic circuits, and so on. The processing circuit 102 may include and/or be coupled to processor readable storage such as a memory 112 that may maintain instructions and data that may be executed by processing circuit 102. The processing circuit 102 may be controlled by one or more of an operating system and an application programming interface (API) layer 110 that supports and enables execution of software modules residing in storage media, such as the memory 112 of the wireless device. The memory 112 may include read-only memory (ROM) or random-access memory (RAM), electrically erasable programmable ROM (EEPROM), flash cards, or any memory device that can be used in processing systems and computing platforms. The processing circuit 102 may include or have access to a local database 114 that can maintain operational parameters and other information used to configure and operate the wireless communications device 100. The local database 114 may be implemented using one or more of a database module, flash memory, magnetic media, EEPROM, optical media, tape, soft or hard disk, or the like. The processing circuit 102 may also be operably coupled to internal and/or external devices, which may include an antenna 122, a display system 124, and operator controls such as buttons 128, 130 and/or a keypad 126, among other components. In some examples, the display system 124 may include a touchscreen component.

Figure 2:
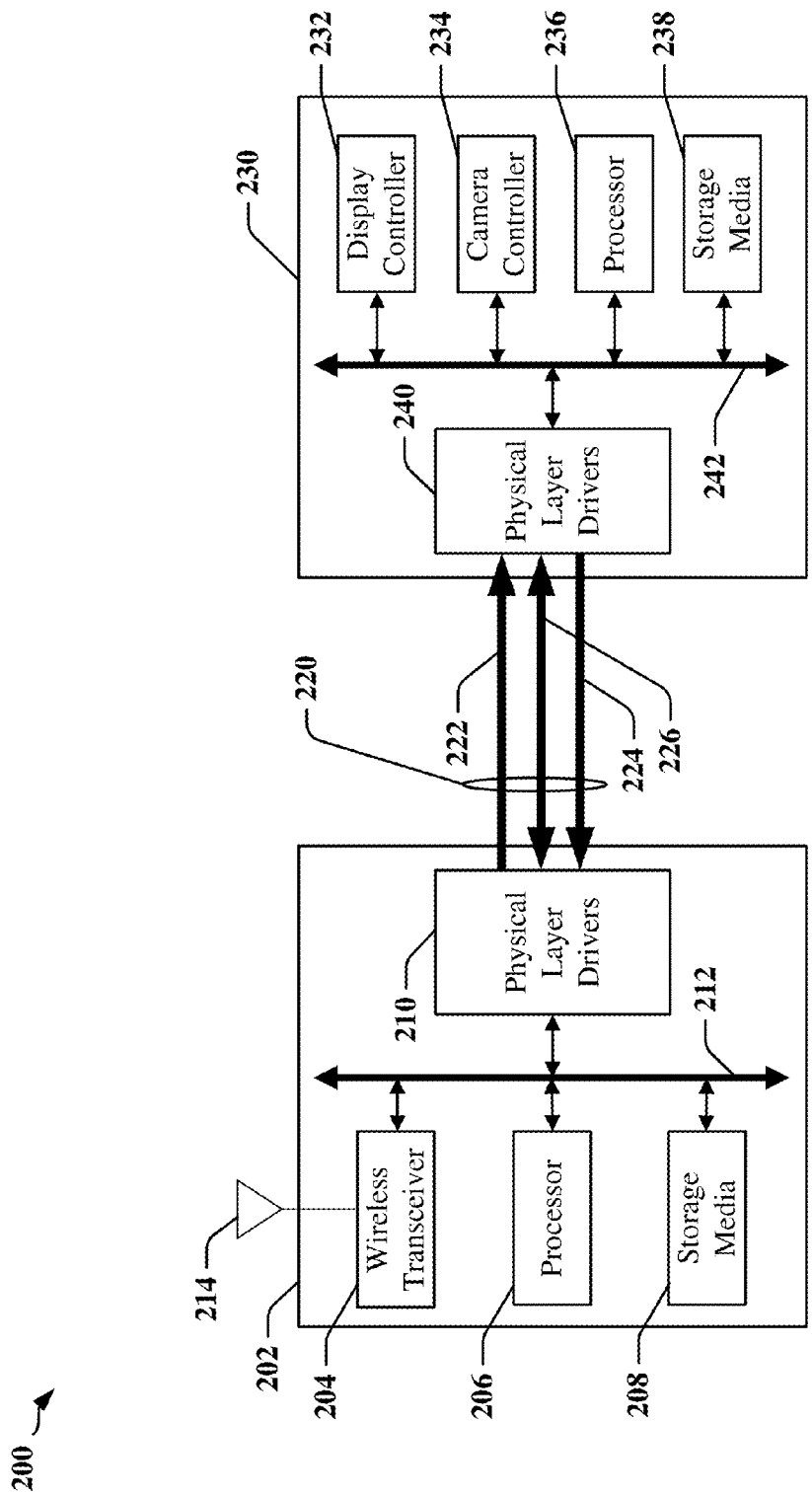
FIG. 2 illustrates a simplified system architecture for an apparatus employing a data link between IC devices.

FIG. 2 is a block schematic diagram 200 illustrating certain aspects of an apparatus such as the wireless communications device 100 of FIG. 1, a wireless mobile computing device, a mobile telephone, a wireless telephone, a notebook computer, a tablet computing device, a media player, a gaming device, a wearable computing device, an appliance, or the like. The apparatus 200 may include a plurality of IC devices 202 and 230 that exchange data and control information through a communications link 220. The communications link 220 may be used to connect two or more IC devices 202 and 230 that are located in close proximity to one another, or that are physically located in different parts of the apparatus 200. In one example, the communications link 220 may be provided on a chip carrier, substrate or circuit board that carries the IC devices 202 and 230. In another example, a first IC device 202 may be located in a keypad section of a smartphone or flip-phone while a second IC device 230 may be located in a display section of the flip-phone, on a touchscreen display panel, etc. In another example, a portion of the communications link 220 may include a cable or optical connection.

The communications link 220 may have multiple individual data links 222, 224 and 226. One communications link 226 may include bidirectional connectors, and may operate in time division, half-duplex, full-duplex, or other modes. One or more communications links 222 and 224 may include unidirectional connectors. The communications link 220 may be asymmetrically configured, providing higher bandwidth in one direction and/or between different IC devices 202, 230. In one example, a first communications link 222 between the two IC devices 202, 230 may be referred to as a forward link 222 while a second communications link 224 between the two IC devices 202, 230 may be referred to as a reverse link 224. In another example, a first IC device 202 may operate or be designated as a host, manager, master and/or transmitter, while one or more other IC devices 230 may be designated as a client, slave and/or receiver, even if both IC devices 202 and 230 are configured to transmit and receive on the communications link 222. In one example, a data link 222 may operate at a higher data rate when communicating data from a first IC device 202 to a second IC device 230 than a data link provided between the first IC device 202 and a third IC device (not shown).

The IC devices 202 and 230 may each include a general-purpose processor or other processing and/or computing circuit or device 206, 236 adapted to cooperate with various circuits and modules in order to perform certain functions disclosed herein. The IC devices 202, 230 may perform different functions and/or support different operational aspects of the apparatus 200. A plurality of IC devices, including the IC devices 202 and 230 may include modems, transceivers, display controllers, user interface devices, Bluetooth interface devices, audio/visual systems, digital-to-analog converters, analog-to-digital converters, memory devices, processing devices, and so on. In one example, the first IC device 202 may perform core functions of the apparatus 200, including maintaining wireless communications through a wireless transceiver 204 and an antenna 214, while the second IC device 230 may support a user interface that manages or operates a display controller 232, and/or may control operations of a camera or video input device using a camera controller 234. Other features supported by one or more of the IC devices 202 and 230 may include a keyboard, a voice-recognition component, application processors, and various input or output devices. The display controller 232 may have circuits and software drivers that support displays such as a liquid crystal display (LCD) panel, touch-screen display, indicators and so on. The storage media 208 and 238 may include transitory and/or non-transitory storage devices adapted to maintain instructions and data used by the respective processors 206 and 236, and/or other components of the IC devices 202 and 230. Communication between each processor 206, 236 and its corresponding storage media 208 and 238 and other modules and circuits may be facilitated by one or more bus 212 and 242, respectively.

Different links 222, 224 and or 226 may be capable of transmitting at comparable speeds or at different speeds, where speed may be expressed as data transfer rate and/or clocking rates. Data rates may be substantially the same or differ by orders of magnitude, depending on the application. In some applications, a single bidirectional link 226 may support communications between the first IC device 202 and the second IC device 230. The forward link 222 and/or reverse link 224 may be configurable to operate in a bidirectional mode and the forward and reverse links 222 and 224 may share the same physical connections, connectors and/or wires. In one example, the communication link 220 may be operated to communicate control, command and other information between the first IC device 202 and the second IC device 230 in accordance with an industry or other standard.

Industry standards may be application specific. In one example, the Mobile Industry Processor Interface (MIPI) standard defines physical layer interfaces, including the SLIMbus interface, that may be used to provide an interface between an application processor IC device 202 and an IC device 230 that supports functional elements and modules of a mobile device, including a camera, display, media player, etc.

Figure 3:
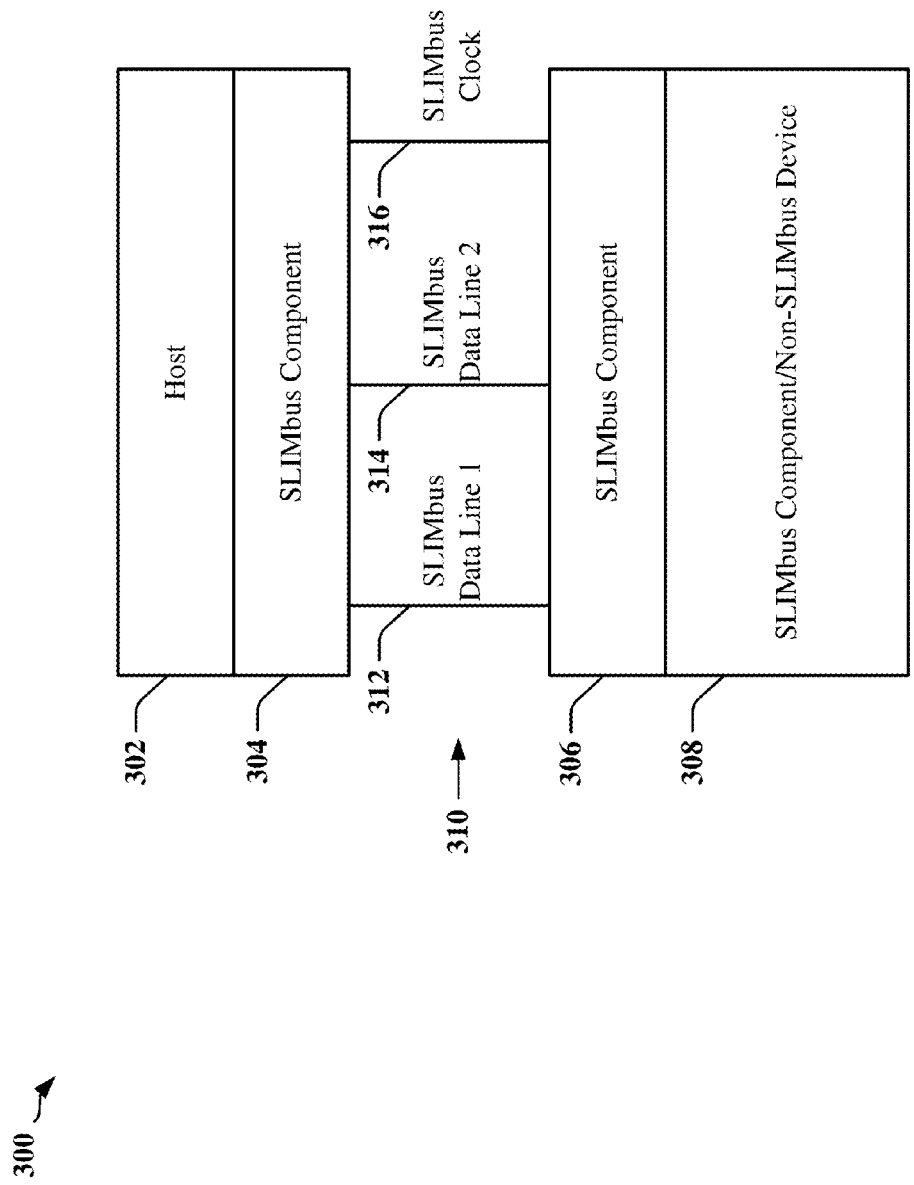
FIG. 3 illustrates a SLIMbus communications link provided between SLIMbus components.

FIG. 3 is a simplified block diagram of a system 300 that illustrates a SLIMbus communications link 310 provided between SLIMbus components 304 and 306. The SLIMbus communications link 310 may include a plurality of SLIMbus data lines 312, 314 deployed between the SLIMbus components 304, 306. As further described herein, the SLIMbus communications link 310 may be adapted or configured to provide more than two data lines as desired or as needed to obtain a desired bandwidth and throughput on the SLIMbus communication bus 310.

The SLIMbus communications link 310 may include a SLIMbus clock line 316 that has a frequency selected by dividing a "root clock" frequency. In some example, the root clock may have a frequency of 28 MHz or more. In some examples, the frequency of the SLIMbus clock line 316 may be selected by using one of 10 available clock gears. Clock gears may divide the clock frequency by powers of 2. In one example, the SLIMbus clock line 316 may have a frequency ($f_{CLK}$) calculated using the equation:

$$f_{CLK} = \frac{f_{ROOT}}{2^{G-10}}$$

where $f_{ROOT}$ is the frequency of the root clock and G is the gear selected. In this configuration, the maximum clock frequency is selected when G=10 and the maximum clock frequency is equal to the frequency of the root clock.

The system 300 may include a host 302 coupled to a first SLIMbus component 304. The first SLIMbus component 304 may be coupled to a second SLIMbus component 306 using the SLIMbus communications link 310, which may include one or more of a first SLIMbus data line 312 and a second SLIMbus data line 314. The second SLIMbus component 306 may be coupled to a third component 308, which may include a SLIMbus component or a non-SLIMbus device.

The host 302 may include a processing circuit that has one or more of a digital signal processor (DSP), a central processing unit (CPU), a graphics processing unit (GPU), a microprocessor, or any combination thereof. The host 302 may include a mobile station modem (MSM), a mobile data modem (MDM), a radio frequency transceiver (RTR), an application processor (APQ), or any combination thereof. The first SLIMbus data line 312 may support a first bandwidth and the second SLIMbus data line 314 may support a second bandwidth. In one example, the first SLIMbus data line 312 and the second SLIMbus data line 314 may be clocked at the same frequency, and the first SLIMbus data line 312 and the second SLIMbus data line 314 may carry data at the same data rate. In another example, the first SLIMbus data line 312 may have a greater bandwidth than the second SLIMbus data line 314. In another example, the second SLIMbus data line 314 may have a greater bandwidth than the first SLIMbus data line 312, when the second SLIMbus data line 314 and the first SLIMbus data line 312 are clocked at different rates. In the latter example, the first bandwidth may be 28 megabits per second (Mbps) and the second bandwidth may be greater than 28 Mbps. Throughput on one or more of the first SLIMbus data line 312 and the second SLIMbus data line 314 may be decreased when the first SLIMbus data line 312 and/or the second SLIMbus data line 314 carries control information.

Each of the plurality of SLIMbus data lines 312, 314 may be a bi-directional data line. In some examples, one SLIMbus data line 312 or 314 may be a bi-directional data line while the second SLIMbus data line 314 or 312 may be a unidirectional data line. As used herein, a bi-directional data line may be a data line that is capable of sending data in different directions between two or more devices. Further, each of the plurality of SLIMbus data lines 312, 314 may be utilized to transmit data associated with a different power level. For example, the first SLIMbus data line 312 may be utilized for low power traffic while the second SLIMbus data line 314 may be utilized for higher power traffic. A power budget may be in effect for certain types of traffic. Power consumption may be managed or controlled in certain applications by configuring one or more of a transmit clock frequency, an encoding scheme used to encode data for transmission on the SLIMbus data line 312 or 314, data compression ratios, type of data encoded, and so on.

During operation, data may be sent from the first SLIMbus component 304 to the second SLIMbus component 306. As used herein, data may include audio data, non-audio data, pulse-code modulation (PCM) audio data, Sony Philips Digital Interface (SPDIF) data, High Definition Audio (HDA) data, professional audio data (i.e., 192 kHz, 24 bit as used in Dolby Surround 5.1/7.1, and certain Roland Music systems), or any combination thereof. The first SLIMbus component 304 may send data on one or more SLIMbus data lines selected from the plurality of SLIMbus data lines 312, 314. For example, the data may be sent via the first SLIMbus data line 312, the second SLIMbus data line 314, or any combination thereof.

In accordance with certain aspects disclosed herein, the first SLIMbus component 304 may send data in parallel over multiple SLIMbus data lines 312 and 314 or send the data serially over a single SLIMbus data line 312 or 314. Whether the data is sent in parallel or serially may depend on factors such as a size of the data, a clock frequency of at least one SLIMbus data line, a compatibility of the data with the SLIMbus data transmission protocol, a priority of the data, a quality of service requirement, or based on any combination of these and/or other factors.

The first SLIMbus component 304 may send data in parallel using the first SLIMbus data line 312 and the second SLIMbus data line 314. In one example, the data may be divided into two portions, and the portions may be transmitted concurrently, or substantially concurrently, over the SLIMbus data lines 312 and 314. Upon receipt, the data may be interleaved and/or concatenated. In another example, the data may be divided into two portions and the first SLIMbus component 304 may send the data serially over one of the first SLIMbus data line 312 and the second SLIMbus data line 314. In some instances, the two portions of data may be transmitted sequentially over either the first SLIMbus data line 312 or the second SLIMbus data line 314. The data may be sent in accordance with a SLIMbus data transmission protocol, a time-division transmission protocol, or a non time-division transmission protocol.

According to certain aspects disclosed herein, the third device 308 may be configured to be compatible with a configuration that supports the plurality of SLIMbus data lines 312, 314, as described herein. For example, the third device 308 may be configured to receive data from the first component 304 over the plurality of SLIMbus data lines 312, 314. Certain data sent to the third device 308 may be transmitted in accordance with a non-SLIMbus protocol, which may be a non-time division protocol or a time-division protocol other than the SLIMbus data transmission protocol.

According to certain aspects disclosed herein, data transmitted over each SLIMbus data line 312, 314 may correspond to different SLIMbus components. For example, the first and second components 304, 306 may be configured to receive and transmit data using the first SLIMbus data line 312 and the SLIMbus clock line 316, while third and fourth SLIMbus components may be configured to receive and transmit data using the second SLIMbus data line 314 and the SLIMbus clock line 316. The same SLIMbus clock line 316 may control timing and rates of data transfer between different components or sets of components that each use a different SLIMbus data line 312, 314.

A SLIMbus device may be restricted or configured for connection to a single SLIMbus data line 312, 314. In some examples, one or more SLIMbus components 304, 306 may be connected to a plurality of available SLIMbus data lines 312, 314, and may be connected to a single SLIMbus clock line 316. In addition, devices configured for compatibility with multiple SLIMbus data lines may coexist in the system 300 with legacy devices that support only one SLIMbus data line.

Figure 4:
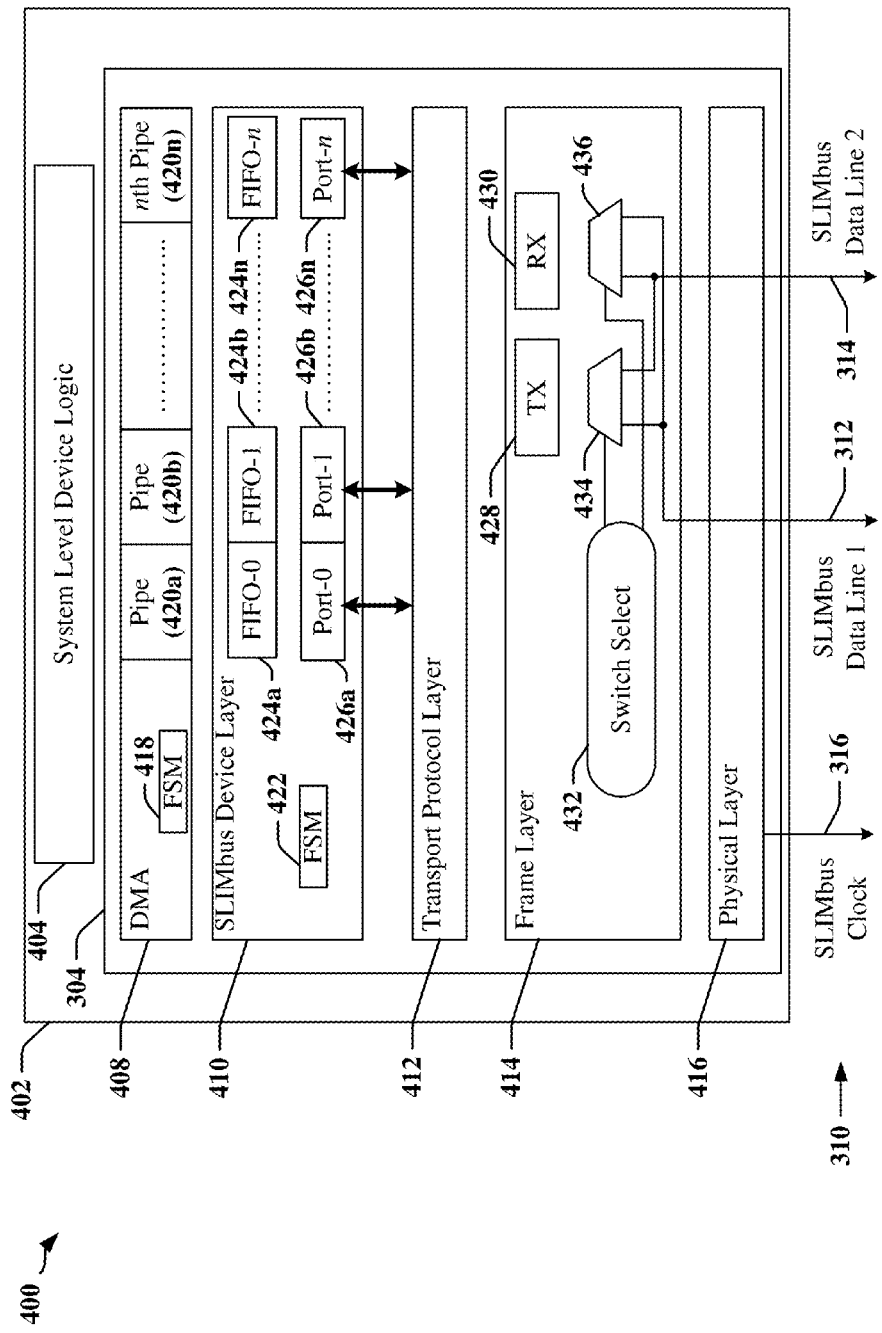
FIG. 4 illustrates a device adapted to communicate over a SLIMbus communications link.

FIG. 4 illustrates an apparatus 400 adapted to communicate over a SLIMbus communications link 310. In the example, the apparatus 400 includes an IC device 402 that can be adapted to communicate with one or more other IC devices (not shown) using a plurality of SLIMbus data lines 312, 314 and the SLIMbus clock line 316.

The IC device 402 may correspond to a functional component implemented using one or more modules or circuits, such as a processing circuit or device, a coder/decoder (CODEC), an input device, an output device, etc. The IC device 402 may include a SLIMbus component 304 or 306 illustrated in FIG. 3, in addition to system level device logic 404. In one example, the IC device 402 operates as a SLIMbus component 304 and the host 302 of FIG. 3 includes the system level device logic 404.

In one example, the IC device 402 may include a direct memory access (DMA) layer 408, a SLIMbus device layer 410, a transport protocol layer 412, a frame layer 414, and a physical layer 416. The DMA layer 408 may include or be implemented by a processing circuit such as a first finite state machine (FSM) 418, a sequencer or other processing circuit or device. The DMA layer 408 may include a plurality of pipes, including a first pipe 420a and a second pipe 420b. The plurality of pipes may include additional pipes up to an nth pipe 420n. The plurality of pipes may be configured as one or more message channels that transmit messages such as data messages and/or user-defined configuration messages.

The SLIMbus device layer 410 may be a generic device layer, an interface device layer, a framer device layer, a manager device layer, or any combination thereof. The SLIMbus device layer 410 may include a processing circuit such as a second FSM 422, one or more First-In-First-Out (FIFO) buffers and one or more ports, which may also be referred to as message ports. In one example, a first FIFO buffer 424a, a second FIFO buffer 424b, and other FIFO buffers up to an nth FIFO buffer 424n, a first port (Port-0) 426a, a second port (Port-1) 426b, up to an nth port (Port-n) 426n. Each port 426a-426n may be connected to a corresponding FIFO buffer 424a-424n. For example, the first port 426a may be connected to the first FIFO buffer 424a, the second port 426b may be connected to the second FIFO buffer 424b and so on, until the nth port 426n which may be connected to the nth FIFO buffer 424n.

In some examples, each port 426a-426n may be coupled to two FIFO buffers 424a-424n, which may enable and/or support bi-directional data transfer capabilities of each individual port 424a-424n. For example, the first port 426a may be connected to the first FIFO buffer 424a and the second FIFO buffer 424b. In addition, the ports may support asynchronous connections thereby making more ports available to the apparatus 400. It will be appreciated that the use of dual-FIFO ports may effectively double an overall number of available ports in a system, because a single pair of ports may be used for bi-directional communication between two devices instead of using a dedicated pair of uplink ports and a dedicated pair of downlink ports.

The frame layer 414 may generate a switch select signal 432 and may include a first multiplexer 434 and a second multiplexer 436. The first multiplexer 434 may be associated with data transmission 428 and the second multiplexer 436 may be associated with data reception 430. The switch select signal 432 may cause the first multiplexer 434 to transmit data via the first SLIMbus data line 312, the second SLIMbus data line 314, or any combination thereof. Alternatively or additionally, the switch select signal 432 may cause the second multiplexer 436 to receive data via the first SLIMbus data line 312, the second SLIMbus data line 314, or any combination thereof.

In some configurations, the frame layer 414 may include a single multiplexer 434 or 436. For example, the IC device 402 may include two frame layers 414, each including a single multiplexer 434, 436. In another example, the transport protocol layer 412 may include the first multiplexer 434 and the second multiplexer 436, and an additional SLIMbus clock line may be used. However, because the additional SLIMbus clock line may consume more power than a SLIMbus data line, implementations involving multiple SLIMbus clock lines may be avoided to reduce power consumption. In one example, a SLIMbus clock line 316 may account for 60-70% of total power consumption attributable to the SLIMbus connection 310.

Figure 5:
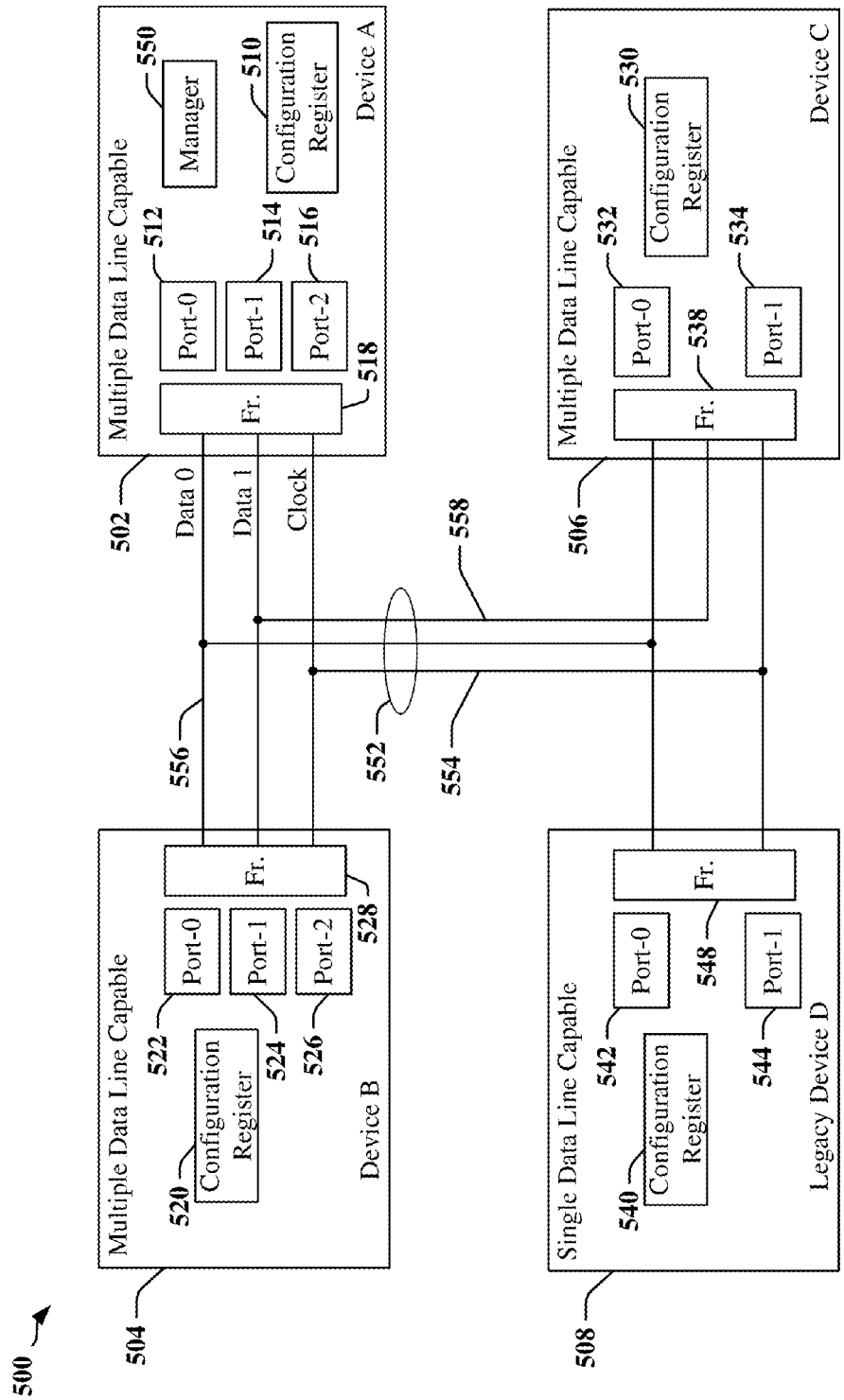
FIG. 5 illustrates a first network of devices connected by a SLIMbus communications link.

FIG. 5 is a block diagram illustrating one example of an apparatus 500 that employs a SLIMbus communications link 552 with multiple data lines 556, 558. In this example, the apparatus 500 may include devices 502, 504 and 506 that have dual data line capable SLIMbus components, and at least one device 508 that includes one or more single data line capable SLIMbus components. Each of the devices 502, 504, 506 and 508 may be provided in, or include an IC device. Each of the devices 502, 504, 506 and 508 may cooperate with one or more other IC devices or other circuits that may be disposed upon a chip carrier, within a single package, or on a circuit board, for example.

In one example, the first device 502 (Device A) may function as an application processor that includes a master or manager 550, a first port (Port-0) 512, a second port (Port-1) 514, and a third port (Port-2) 516. The first device 502 may also include a framer 518 and a configuration register 510 that maintains configuration parameters and other information related to the operation of the first device 502. The framer 518 may correspond to, and/or implement certain functions of the frame layer 414 of FIG. 4, for example. The second device 504 (Device B) may be an audio CODEC and may include a first port 522, a second port 524, a third port 526, a framer 528 and a configuration register 520. The third device 506 (Device C) may be a data modem that includes a first port 532, a second port 534, a framer 538 and a configuration register 530. The fourth device 508 (Legacy Device D) may be a legacy device, such as an input or output device (including, for example, a device related to a speaker or a microphone) that is manufactured without multiple data line SLIMbus capabilities. The fourth device 508 may include a first port 542, a second port 544, a framer 548 and a configuration register 540.

In operation, the manager 550 may configure communications within the apparatus 500 based on a determination of the capabilities of the SLIMbus components of each of the devices 502, 504, 506 and 508. The configuration typically takes account of the data line capabilities (single, double, multiple) of the constituent devices 502, 504, 506 and 508. The manager 550 may be implemented as some combination of hardware and software. In one example, the manager 550 may be implemented in Device A 502, and may include or employ a processing circuit, a sequencer, a state machine, software and firmware, or any combination thereof. The manager 550 may determine the configuration of SLIMbus components during an enumeration process. For example, during enumeration, the manager 550 may determine that the first device 502, the second device 504, and the third device 506 have dual data line capable SLIMbus components and that the fourth device 508 has a single data line capable SLIMbus component.

The manager 500 may determine the capabilities of each SLIMbus component by querying one or more of the configuration registers 510, 520, 530, 540, which maintain information identifying the capabilities of corresponding SLIMbus components or devices 502, 504, 506 and/or 508. In one example, information related to SLIMbus component capabilities may be predefined by a device manufacturer. In another example, the information related to SLIMbus component capabilities may be configured by a system integrator.

In some instances, the capabilities of each SLIMbus component may be determined based on communication with a high-level operating system (HLOS). For example, an HLOS associated with a particular device 502, 504, 506 and/or 508 may provide a configuration file, and may exchange capability bits for each device. The HLOS may use a look-up table and/or query a configuration database for capability information.

In some examples, the capabilities of each SLIMbus component may be determined through dedicated messaging, including information transmitted through a dedicated message channel. In one example, the dedicated message channel is provided using one or more time slots on a primary data line 556, which may be connected to all SLIMbus devices 502, 504, 506, 506. In some examples, one or more user-defined messages may be transmitted between SLIMbus components, where the user-defined messages include data indicating whether the SLIMbus components are configurable or configured for single data line, dual data line, or capable of supporting another number of SLIMbus data lines.

Figure 6:
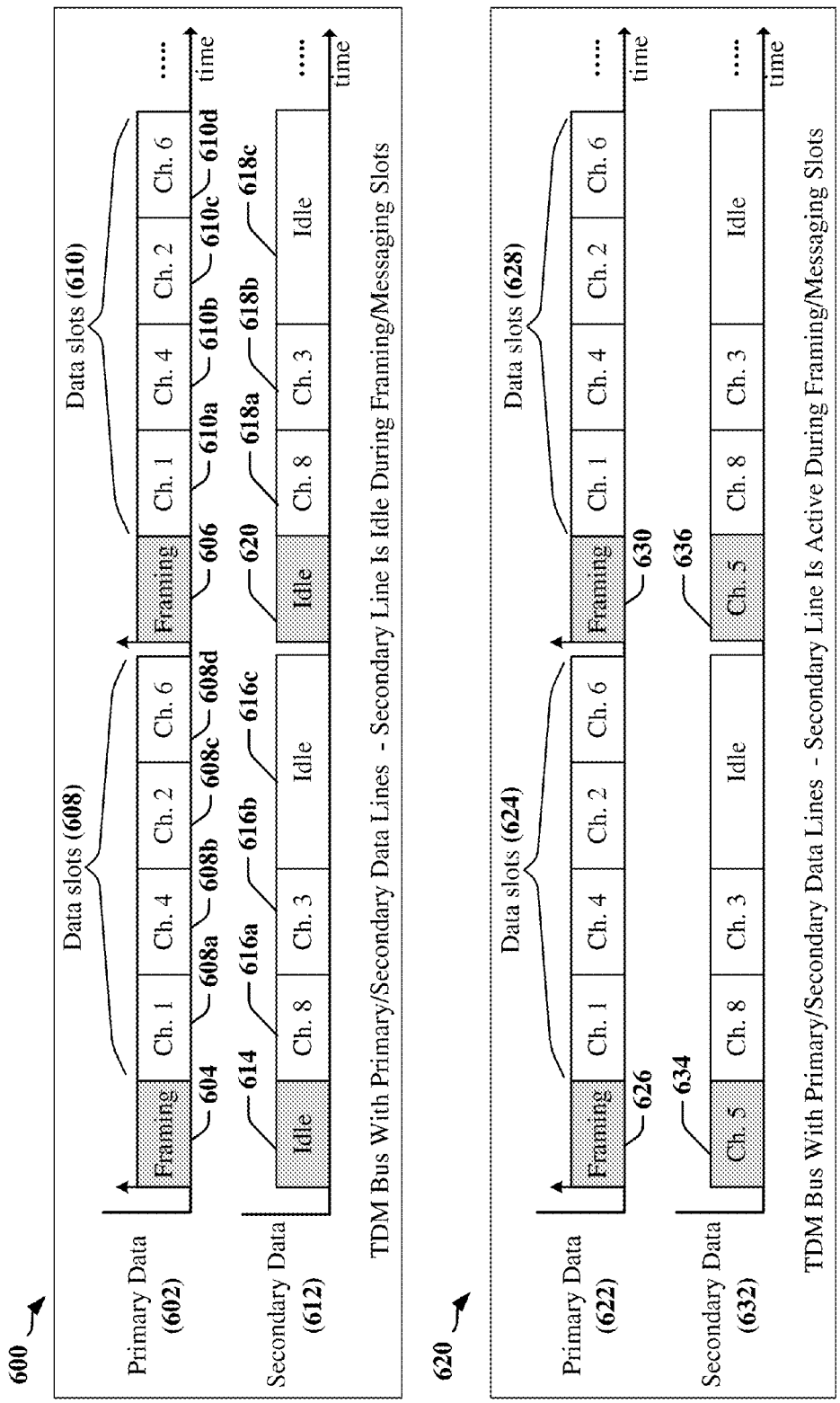
FIG. 6 illustrates scheduling on a SLIMbus communications link.

FIG. 6 includes scheduling diagrams 600, 620 that illustrate timing of transmissions associated with a SLIMbus communications link in accordance with certain aspects disclosed herein. The scheduling diagrams 600 and 620 illustrate different examples of scheduling applicable to the apparatus 500 of FIG. 5. The first scheduling diagram 600 relates to an example of scheduling when a common messaging and framing is used for a plurality of SLIMbus data lines 556 and 558, while the second scheduling diagram 620 relates to an example of scheduling when each of a plurality of SLIMbus data lines 556 and 558 uses individualized messaging and framing configurations.

The first scheduling diagram 600 relates to an example in which data may be communicated from a first SLIMbus component 502, 504, 506 and/or 508 to one or more ports of a second SLIMbus component 502, 504, 506 and/or 508 using time-division multiplexing (TDM). In a TDM scheme, a sequence of primary data frames 602 may be transmitted on a primary data line 556. A plurality of sequential time intervals (slots) may be defined by the TDM scheme. In one example, a slot may be defined as four contiguous bits. Bandwidth allocation for various data organizations, from 4-bit data to 32-bit data (or more) can be accomplished by grouping the 4-bit Slots. The duration, function and frequency of occurrence of each slot may be configured according to application needs and operational considerations. A frame may be defined as including 192 contiguous slots. Each primary data frame 602 typically includes framing slots 604 and 608 that precede one or more data slots 608a-608d and 610a-610d, respectively. In one example, the first slot of each frame may be defined as a control slot, which may carry a 4-bit frame sync symbol and other slots may carry framing information. A superframe may be defined as a transmission that includes 8 contiguous frames. The timing of a superframe may be defined by the timing of slots in the constituent frames that make up the superframe, and the superframe transmission rate may be dynamically configured through selection of a combination of the root frequency and gearing.

The data slots 608 and 610 may be used to carry the payload data of one or more messages. The data slots 608 and 610 may be allocated to one or more channels, where each channel carries data between a source SLIMbus component 502, 504, 506 and/or 508 and a destination SLIMbus component 502, 504, 506 and/or 508. For example, a first data slot 608a and 610a may be allocated to a first channel for communications between a first port 512 of the first device (Device A) 502 and a second port 534 of the third device (Device C) 506, data slots 608c and 610c may be allocated to carry a second channel for communications between a first port 522 of the second device (Device B) 504 and a second port 544 of the fourth device (Device D) 508. The remaining slots 608b/610b and 608d/610d may be allocated for other channels, and/or may be placed in an idle state.

A sequence of secondary data frames 612 may be concurrently or contemporaneously transmitted on the secondary SLIMbus data line 558. The secondary data frames 612 may be apportioned into data slots 614, 616a-616c, 618a-618c and 620 corresponding in time to data slots of the primary data frames 602. In the first example 600, the first data slots 614 and 620 in the secondary data frames 612 may be idled or otherwise unused and the framing information received in data slots 604 and 606 of the primary data frames 602 may be used to configure the secondary data frames 612. In this configuration, additional bandwidth may be defined for channels defined on the primary data frames 602, and/or additional channels may be defined on the secondary data frames 612. In one example, data transmitted in the first channel may use one or more data slots 616a-616c of the secondary data frames 612 in addition to the data slots 608a and 610a allocated in the primary data frames 602. In another example, data transmitted from the second port 514 of Device A 502 to the second port 524 of Device B 504 may be sent in a third channel that is allocated one or more data slots 616b and 618b of the secondary data frames 612.

Data may be transmitted between a pair of devices 502, 504, 506 and/or 508 using two or more physical SLIMbus lines 556 and 558 and in multiple data slots 608, 610. Data sent over multiple SLIMbus data lines 556 and 558 and/or in multiple data slots 608, 610 may be time interleaved upon receipt. The data slots in the primary data frames 602 and in the secondary data frames 604 may be associated with a common clock cycle, configured by information provided in the framing slot 604, 606. As a result, the data may be sent over the first and second SLIMbus data lines 556 and 558 synchronously, in parallel, simultaneously, and/or substantially simultaneously.

During the framing slots 604 and 606, the second SLIMbus data line 558 may be idle. In some conventional implementations, certain data slots 616c and 618c of the secondary data frames 604 may be idled when corresponding data slots 608c, 608d, 610c and 610d are used for communications involving a device 508 that is not dual data line capable. According to certain aspects disclosed herein, other devices 502, 504 and 506 may attempt to establish private data communications channels utilizing the idle data slots 616c, 618c in the secondary data frames 612 by scheduling communication between themselves. It will be appreciated that this may result in systems in which the existence of communications channels on a second SLIMbus data line 558 is "hidden" from non-participating device 502, 504 or 506. Moreover, the existence of the secondary data line 558 may be concealed from legacy devices 508 that are compatible with a single SLIMbus data line. In some instances, the manager 550 may be responsible for scheduling and configuring data rates using a hidden second SLIMbus data line 558 even if the managing device 550 of the apparatus 500 is implemented on a legacy device 508 incapable of receiving communications over the second SLIMbus data line 558.

The second scheduling diagram 620 illustrates an example of data communications in which the data slots 634, 636 of the secondary data frames 632, which correspond to the framing slots 626, 630 of the primary data frames 622, can be allocated to communications channels between SLIMbus components 502, 504, and/or 506 that are capable of receiving communications over the second SLIMbus data line 558. Bandwidth and throughput may be maximized for implementations where messaging and framing is coordinated for all SLIMbus data lines 556, 558. In some examples, data slots of the primary data frames 622 and the secondary data frames 632 may correspond to different clock cycles or bus cycles, and may have different timing. Therefore, in addition to sending data synchronously or in parallel as described with respect to the first scheduling diagram 600, data may be transmitted asynchronously between SLIMbus component 502, 504, 506 and/or 508.

The SLIMbus component 502, 504, 506 and/or 508 may be configured to permit transmission from a single source SLIMbus component 502, 504, 506 and/or 508 to multiple destination SLIMbus component 502, 504, 506 and/or 508. For example, data may be transmitted from the second port 524 of Device B 504 to the second port 514 of Device A 502, and to the first port 532 of Device C 506 over the first SLIMbus data line 556 and the second SLIMbus data line 558 during the selected data slots 608, 610, 624 and 628. Scheduling for data communications between two or more SLIMbus ports 512, 514, 516, 522, 524, 526, 532, 534, 542 and/or 544 over one or more SLIMbus data lines 556 and 558 may be effected using a common bus cycle based on a centrally controlled clock.

Certain aspects of conventional SLIMbus communications links may limit the ability of the technology to respond to demands for increased bandwidth and throughput. The rate of the data traffic that is needed for certain high bandwidth applications requires that a root frequency to be increased to 24.576 MHz or a higher multiple thereof in order to maintain bus efficiency and enable the continued use of isochronous transfer protocols. Isochronous data transfer can be used for the transmission of real-time data, including audio and video data. Isochronous transfer or transport protocols may be used to meet delivery requirements that require information to be delivered within a certain time period. However, increased root frequencies can lead to slew rate issues that affect the ability of a receiver to decode transmitted data.

Figure 7:
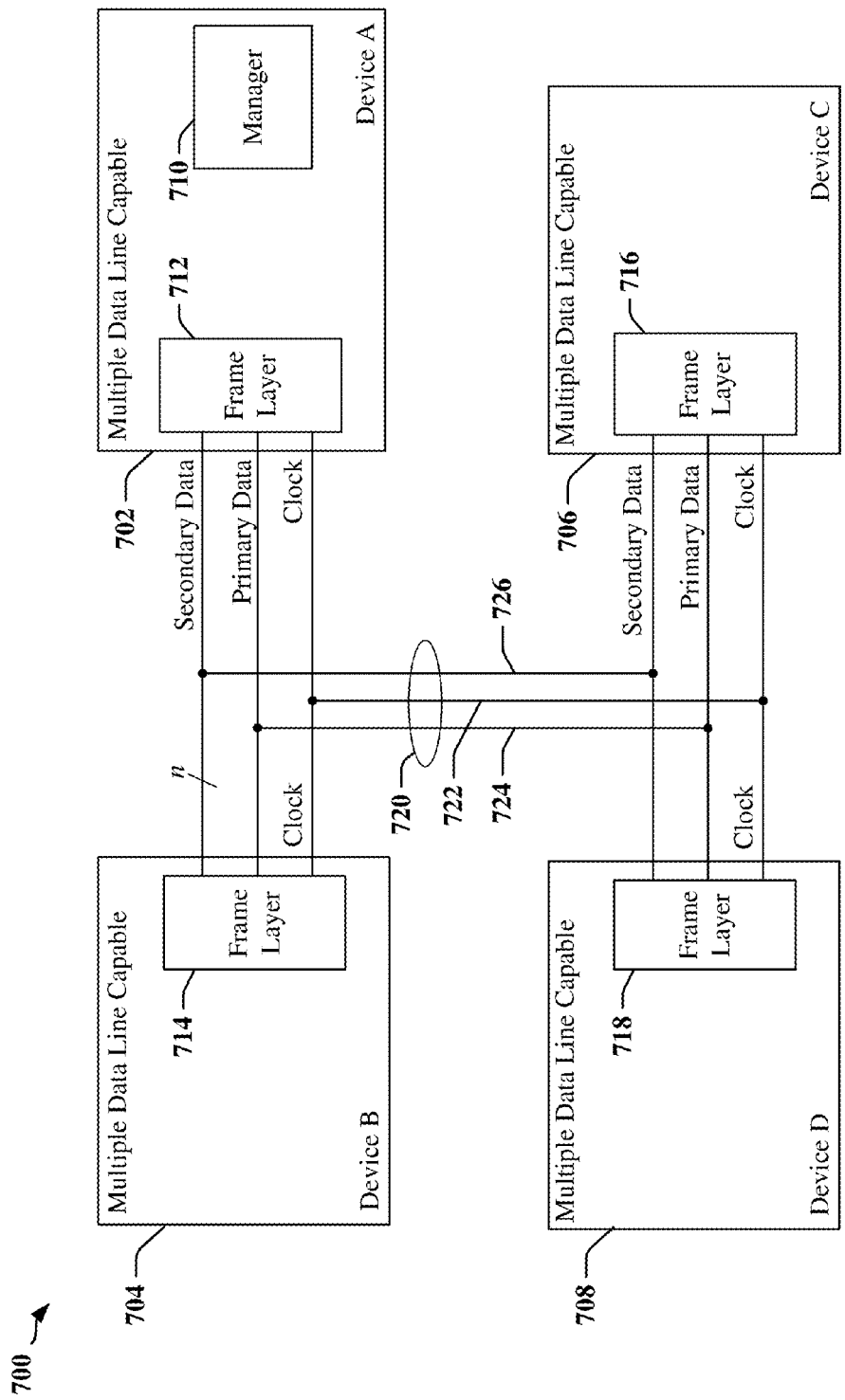
FIG. 7 illustrates a second network of devices connected by a SLIMbus communications link that has multiple data lines and a manager.

FIG. 7 is a block diagram illustrating an example of an apparatus 700 that employs an expanded SLIMbus communications link 720 with a primary data line 724 and one or more (n) secondary data lines 726. The apparatus 700 may include devices 702, 704, 706 and 708 which have multiple data line capable SLIMbus components. The devices 702, 704, 706 and 708 may be provided in a single IC device, or may include one or more IC devices coupled to other circuits and disposed upon a chip carrier, circuit board or within a single package, for example. According to certain aspects disclosed herein, communications channels may be implemented using some combination of the primary data line 724 and one or more of the secondary data lines 726 that carry messages in compliance with SLIMbus specifications, and/or one or more of the secondary data lines 726 configured to carry messages on non-SLIMbus communications channels. In some examples, secondary data lines 726 may be configured to provide a decentralized or private SLIMbus communications channels to further improve available bandwidth and throughput within the apparatus 700.

In some instances, a plurality of the n secondary data lines 726 may be used for directly connecting two or more devices 702, 704, 706 and 708. In one example, one or more of the n secondary data lines 726 may be reserved for communications between two or more of the devices 702, 704, 706 and 708, while at least the primary data line 724 is monitored and/or used for communication by all of the devices 702, 704, 706 and 708.

Timing of each of the secondary data lines 726 may be configured to follow the same relationship as the clock line and the primary data line 724. In one example, secondary data lines 726 do not carry any control information and all devices 702, 704, 706 and 708 can maintain bus synchronization based on signaling associated with the primary data line 724. Accordingly, there may be no necessity to synchronize the n secondary data lines 726 with one another, or to handle loss of synchronization on one of the secondary data lines 726.

Each device 702, 704, 706 and 708 may include a framer module in the Frame Layer 712, 714, 716 and 718. A management module (Manager) 710 may be operated on one of the devices 702, 704, 706 or 708.

Figure 8:
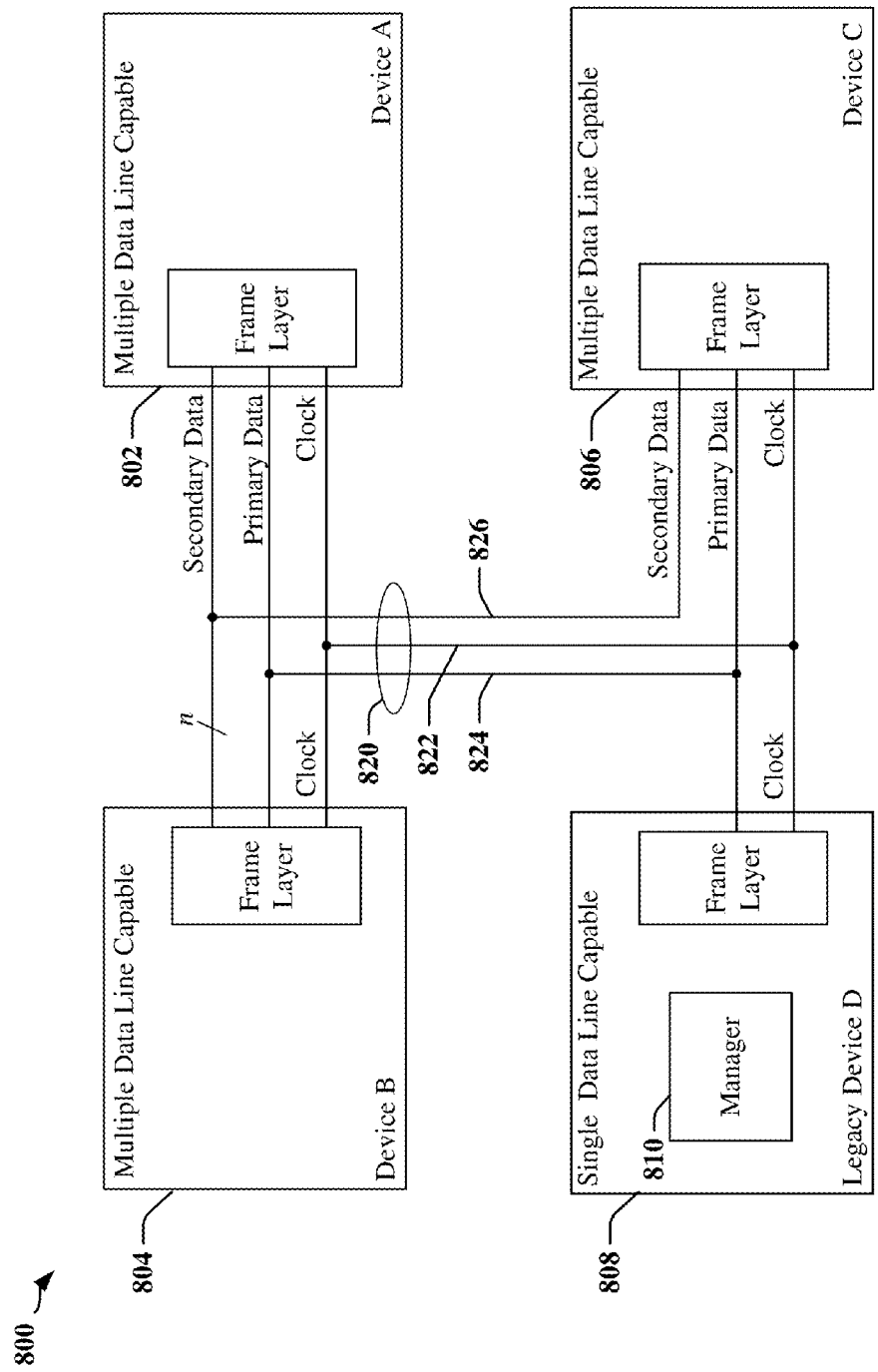
FIG. 8 illustrates a third network of devices connected by a SLIMbus communications link that has multiple data lines.

FIG. 8 illustrates an example of a SLIMbus communications link 820 that connects a plurality of multiple SLIMbus data line capable devices 802, 804, 806 and at least one single data line capable SLIMbus device 808. In this example, a manager 810 may be active on the device or component 808 that supports only a primary data line 824, although the manager 810 may control configuration and operation of multiple secondary data lines 826 and a clock signal 822 used by other devices 802, 804, 806.

Figure 9:
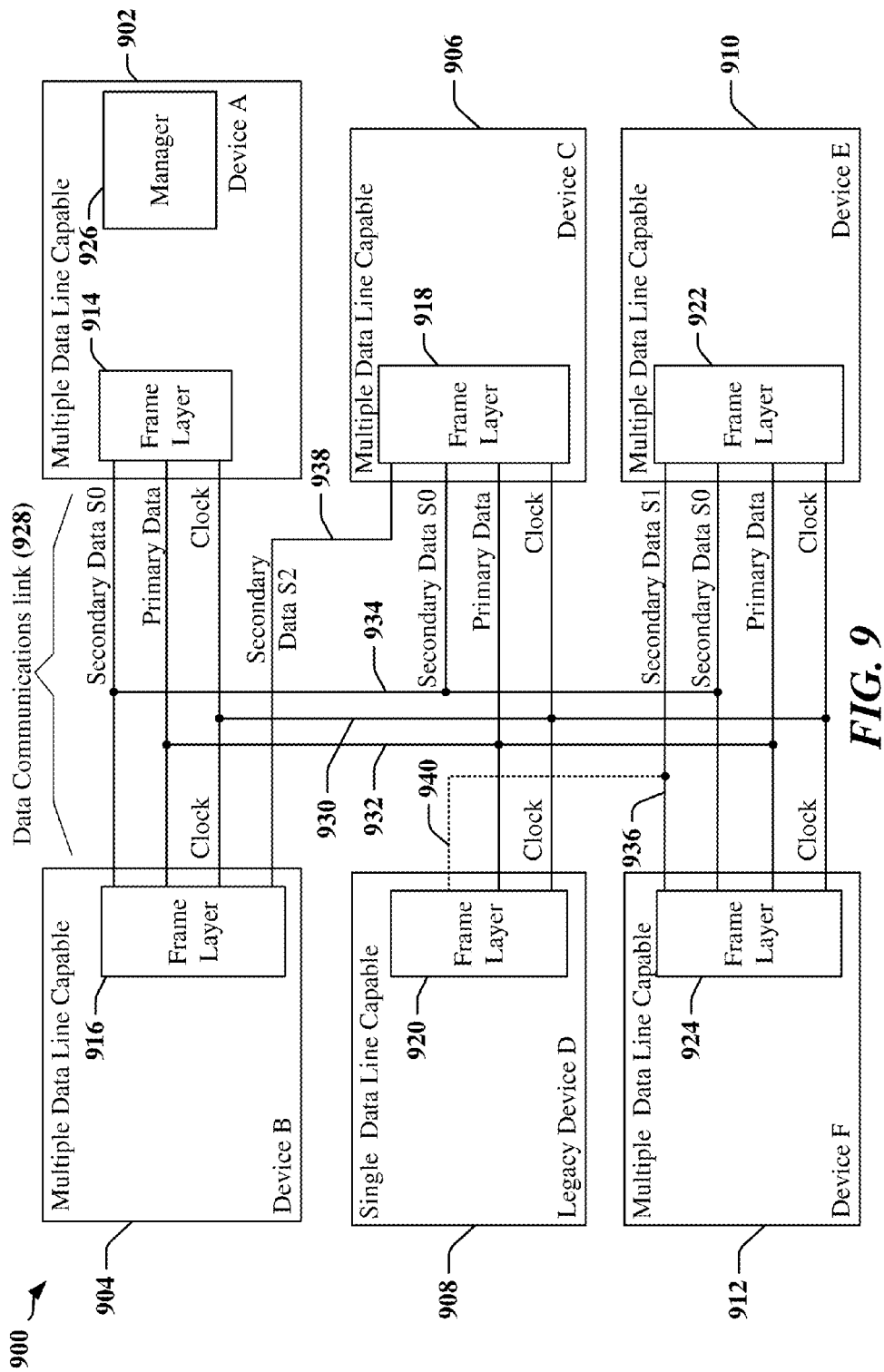
FIG. 9 illustrates a fourth network of devices connected by a configurable SLIMbus communications link that has multiple data lines including shared and private data lines.

FIG. 9 is a block diagram 900 illustrating an example of an apparatus in which communications between a plurality of IC devices 902, 904, 906, 908, 910 and 912 is facilitated by a flexibly configurable data communications link 928. In the example, the plurality of the IC devices 902, 904, 906, 908, 910 and 912 may be configured to communicate according to a SLIMbus protocol. In one example, some or all of the plurality of the IC devices 902, 904, 906, 908, 910 and 912 may transmit, receive and/or monitor communications on at least a primary SLIMbus data line 932. Some or all of the plurality of the IC devices 902, 904, 906, 908, 910 and 912 may receive timing information from the SLIMbus clock 930. Accordingly, each of the IC devices 902, 904, 906, 908, 910, and 912 may include a framer 914, 916, 918, 920, 922, and 924 configured to receive and/or transmit information according to SLIMbus protocols and timing. The information may include configuration and timing information generated by a manager component 926. For example, the configuration and timing information may include setup and other parameters maintained and/or reported by each of the plurality of the IC devices 902, 904, 906, 908, 910 and 912, and timeslot allocations provided by the manager 926.

In one example, the manager 926 may receive configuration parameters reported by some or all of the IC devices 902, 904, 906, 908, 910 and 912 indicating availability of single-line or multi-line SLIMbus data transmission and reception capabilities. In another example, one or more of the IC devices 902, 904, 906, 908, 910 and 912 may report the presence of a hidden secondary data line 936, 938 that may be used for private or direct communications channels between two or more devices. The private or direct communications channels may be operated using SLIMbus protocols synchronized with the SLIMbus clock 930 and/or may be operated using a different time-division or non-time division protocol that may be synchronized based on the SLIMbus clock 930, at the frame level, or not synchronized with SLIMbus operations.

In another example, the manager 926 may allocate communications channels on secondary data lines 934, 936 and 938 for the use of pairs or groups of the plurality of the IC devices 902, 904, 906, 908, 910 and 912. Accordingly, dedicated secondary data lines 936 and 938 may be connected to all of the IC devices 902, 904, 906, 908, 910 and 912, but monitored and/or used by only a few of the IC devices 902, 904, 906, 908, 910 and 912. For example, the manager 926 may configure the data link such that a secondary data line 936 is available for the sole use of a first pair of IC devices 910 and 912, while a second secondary data line 938 is restricted or otherwise available for the sole use of a second pair of IC devices 904 and 906.

In each of these examples, configuration, timing and global multicast communications (i.e., between all of the IC devices 902, 904, 906, 908, 910 and 912) may be restricted to the primary data line 932. The primary data line 932 and a common secondary data line 934 may be used to carry communications channels between those IC devices 902, 904, 906, 910 and 912 that are capable of multi-line communication and that are connected to the common secondary data line 934. The common secondary data line 934 may be used for multicast messages directed to any subset of the IC devices 902, 904, 906, 910 and 912 that is connected to the common secondary data line 934.

The clock signal 930 may serve as a master clock used to synchronize one or more clocks that provide timing for signaling on corresponding data lines 932, 934, 936 and 938. In some examples, signaling on each data line 932, 934, 936 and/or 938 may be derived from or synchronized to the SLIMbus clock 930.

The data link 928 may be implemented as a physical bus having multiple data lines 930, 932, 934, 936, 938, whereby the IC devices 902, 904, 906, 908, 910 and 912 may selectively be physically connected to some configuration of the data lines 930, 932, 934, 936, 938. Thus, the first private channel between IC devices 910 and 912 may be implemented by physically connecting the IC devices 910 and 912 to the S1 secondary data line 936, where the remaining IC devices 902, 904, 906 and 908 are not connected to the S1 secondary data line 936. Alternatively or additionally, a private channel may be constructed by causing only the subject pair of IC devices 910 and 912 to connect, monitor and/or otherwise use the S1 secondary data line 936. The channelization of a common data line 932, 934 according to a time-division protocol allows the common data line 932, 934 to be used as a private channel for a larger number of IC devices 902, 904, 906, 908, 910 and 912, which are configured to use the common primary data line 932 or secondary data line 934 (for example) only during an allocated time slot.

The data communications link 928 may be adapted or configured to implement a broad range of topologies. Available topologies may include point-to-point secondary data lines 936, 938 provided privately between pairs of the IC devices 902, 904, 906, 908, 910 and 912 and/or multipoint secondary data lines 936, 938 provided privately between trios and other combinations of the IC devices 902, 904, 906, 908, 910 and 912.

In some topologies, legacy single data line capable IC devices 908 may be provisioned with a signal line 840 configured to communicate with one or more other IC devices 902, 904, 906, 910 and 912 through a secondary data line 934, 936 or 938. For example, the legacy IC device 908 may be coupled to the S1 secondary data line 936 (or to any other secondary data line 934, 938) using a different protocol and/or type of physical connection and may receive configuration information indirectly through another multiple data line capable IC device 910 and/or 912 as well as through the primary data line 932. The legacy IC device 908 may be configured and operated as a slave to the multiple data line capable IC device 910 and/or 912 or the multiple data line capable IC device 910 and/or 912 may pass through configuration and other information from the manager 926.

A hierarchical network may be constructed that optimizes communications based on priority, data rates, quality of service requirements and profiles of sources and/or destinations for communications associated with the IC devices 902, 904, 906, 908, 910 and 912. In one example, communications over the S1 secondary data line 936 may be clocked at lower rates than data is clocked on the primary data line 932 or the common secondary data line 934, and the connection of the legacy IC device 908 through another IC device 910 or 912 may improve overall system throughput. In another example, the legacy IC device 908 may be connected to a secondary data line 934, 936, or 938 that operates according to a lower rate clock than the primary data line 932, such that the primary data line 932 can operate at an optimal or highest clock rate while the legacy IC device 908 can communicate at a rate consistent with its capabilities.

The data communications link 928 may be configured by a process consistent with SLIMbus protocols. For example, the manager 926 may transmit configuration and/or programming messages to each IC device 902, 904, 906, 908, 910 and/or 912. The configuration and/or programming messages may define the topology, clock rates and communication channel allocations to timeslots and data lines from the perspective of each IC device 902, 904, 906, 908, 910 and 912. After configuration/programming messages have been transmitted to each IC device 902, 904, 906, 908, 910 and 912, a "RECONFIG_NOW" message may be transmitted to each IC device 902, 904, 906, 908, 910 and 912. In response to receiving the "RECONFIG_NOW" message, each of the IC devices 902, 904, 906, 908, 910 and 912 may begin operating in accordance with the most recently received configuration/programming message at the next appropriate frame boundary. In some examples, the "RECONFIG_NOW" message may be used to synchronize configuration/programming of the SLIMbus components.

Configuration can be defined independently for individual IC devices 902, 904, 906, 908, 910 and 912, pairs of IC devices 902, 904, 906, 908, 910 and 912, or other sized groups or sets of IC devices 902, 904, 906, 908, 910 and 912. Configuration information may be provided in multiple stages, such that one or more IC devices 902, 904, 906, 908, 910 and 912 may be configured individually and may receive additional configuration or reconfiguration of certain parameters in one or more group configuration/programming messages. Furthermore, a "RECONFIG_NOW" message may be used to provoke selective response by one or more IC devices 902, 904, 906, 908, 910 and 912 based on which devices or pairs, trios and other groups or sets of IC devices 902, 904, 906, 908, 910 and 912 are addressed by the "RECONFIG_NOW" message.

As shown in FIG. 6, framing and control slots 634 and 636 may be used for data transmission on a secondary data line 934, 936 and/or 938, while framing and control information is transmitted in corresponding slots 626 and 630 on the primary data line 932. In some examples, the slots 634 and 636 on a secondary data line 934, 936 and/or 938 may be reserved for framing and control information when a downstream IC device 908 relies on an upstream IC device 910 or 912 to relay framing and control information from the manager 926. In some instances, the framing and control information transmitted on the secondary data line 934, 936 and/or 938 may be reformatted before transmission in order to accommodate legacy IC devices 908.

In some examples, the framing and control information transmitted on the secondary data line 934, 936 and/or 938 may be reformatted when the secondary data line 934, 936 and/or 938 is operated in accordance with a non-SLIMbus protocol. One or more secondary data lines 934, 936 and/or 938 may be reserved for non-SLIMbus data channels. In such instances, a modified framing and startup process may be employed for secondary data lines 934, 936 and/or 938 that are reserved for non-SLIMbus data channels.

The general startup and framing procedures used for SLIMbus data lines 932, 934, 936 and/or 938 may be adapted for use with non-SLIMbus data channels. In one example, these general startup framing procedures include causing the secondary data lines 934, 936 and/or 938 to become inactive whereby any component that is not in an operational state refrains from driving a secondary data line 934, 936 and/or 938, such that data on the secondary data lines 934, 936 and/or 938 is only transmitted/received after a data channel has been configured by the Manager 926.

Secondary data lines 934, 936 and/or 938 may start in a low logic state to ensure proper Non-Return-to-Zero Inverted (NRZI) encoding and decoding at each of the SLIMbus devices 902, 904, 906, 908, 910 and/or 912. In a SLIMbus interface, all SLIMbus devices 902, 904, 906, 908, 910 and/or 912 are required to listen to the primary data line 932 to ensure that synchronization and control information is captured. The SLIMbus infrastructure for a data communications link 928 that has multiple secondary data lines 934, 936 and 938 can remain identical or comparable to a single data line SLIMbus implementation, regardless of the ability of connected SLIMbus devices 902, 904, 906, 908, 910 and/or 912 to support secondary lines.

A secondary data line 934, 936 and/or 938 may have a topology that is different from the topology of the primary data line 932, or from any other secondary data line 934, 936 and/or 938. The manager 926 may correctly configure the data communications link 928 and allocate data channels when the manager 926 is aware of the capabilities and desired configuration of the SLIMbus devices 902, 904, 906, 908, 910 and/or 912. All data channels allocated by the manager 926 may be transmitted and/or received on a single data line 932.

In one example, a data communications link 928 may be configured such that secondary data lines 934, 936 and 938 operate in parallel with the primary data line 932. The secondary data lines 934, 936 and 938 typically do not include control spaces such as time slots used for framing and control purposes. Accordingly, control space collisions are prevented on a secondary data line 934, 936 and/or 938, where a collision may refer to the result of a simultaneous transmission by two or more devices on a data bus that is operated using a multi-drop bus topology. Framing and control messages may be transmitted in channels on the primary data line 932. Secondary data lines 934, 936 and/or 938 may maintain the same control characteristics as the primary data line 932, including the root clock frequency, clock gear settings and so on. A superframe boundary, frame count, and slot counts may be calculated and maintained by components/devices based on signaling on the primary data line 932. Therefore, the SLIMbus devices 902, 904, 906, 908, 910 and/or 912 cannot typically lose superframe or Frame sync on a secondary line if it maintains synchronization with the primary data line 932. When the data communications link 928 is configured for a parallel distribution, channel allocation may be restricted to an even number of time slots.

One or more dedicated information elements of a control/framing field may be assigned for configuring SLIMbus devices 902, 904, 906, 908, 910 and 912 to support additional secondary data lines. In one example, such information elements may be used for enumerating secondary data lines 934, 936 and/or 938.

The SLIMbus protocol may be adapted to include additional control and framing messages when multiple secondary data lines 934, 936, 938 are used. In one example, the additional control and framing messages may include "NEXT_DEFINE_DATA_LINE," "NEXT_EXTENDED_DEFINE_CHANNEL," and/or other messages that may be used to allocate and/or configure data line numbers and channels. Legacy IC devices 908 that cannot support multiple data lines may respond with a negative acknowledgement (NACK) in response to such additional commands.

Figure 10:
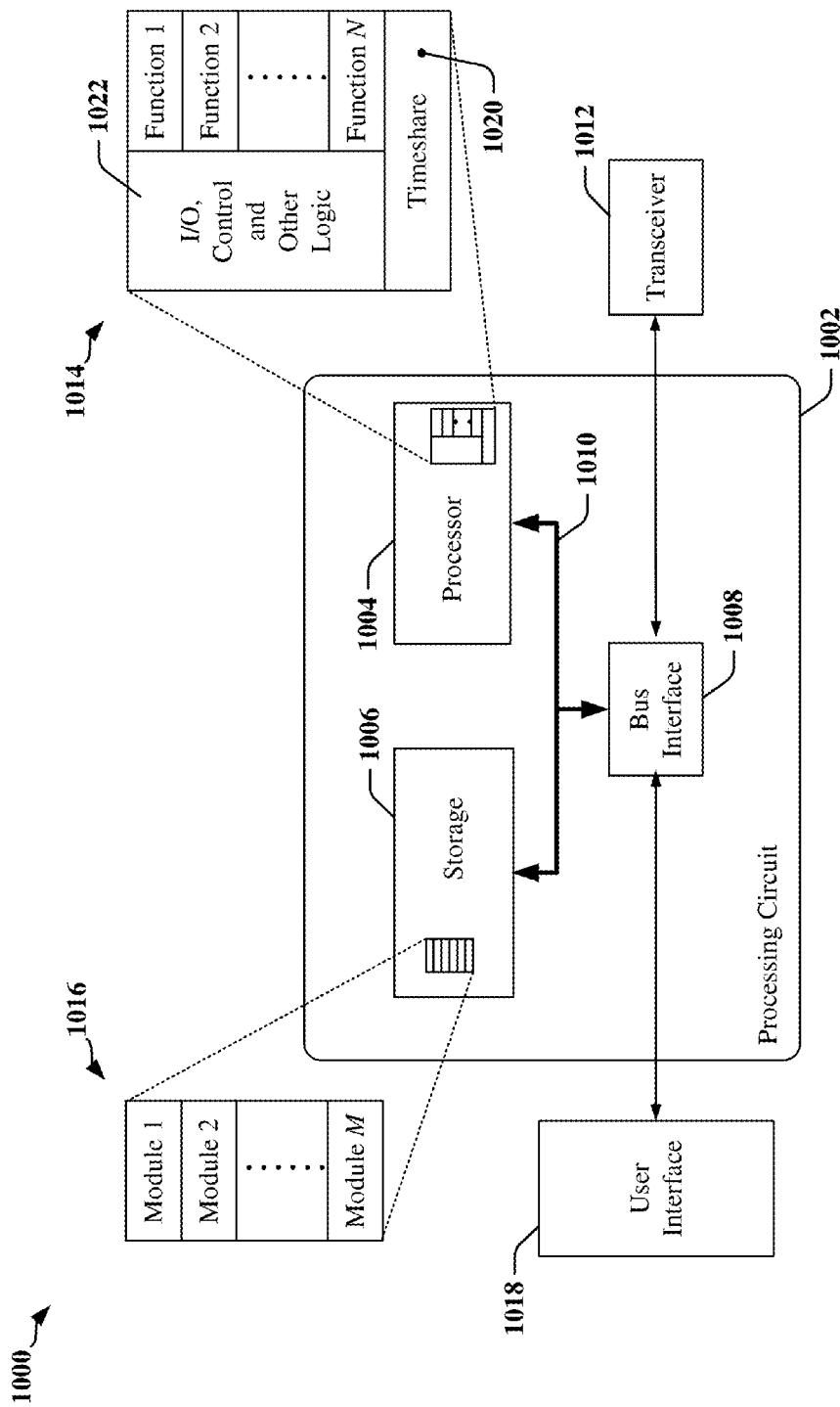
FIG. 10 is a block diagram illustrating an example of an apparatus employing a processing system that may be adapted according to certain aspects disclosed herein.

FIG. 10 is a conceptual diagram 1000 illustrating a simplified example of a hardware implementation for an apparatus employing a processing circuit 1002 that may be configured or adapted according to certain aspects disclosed herein. In accordance with various aspects of the disclosure, an element, or any portion of an element, or any combination of elements as disclosed herein may be implemented using the processing circuit 1002. The processing circuit 1002 may include one or more processors 1004 that are controlled by some combination of hardware and software modules. Examples of processors 1004 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. The one or more processors 1004 may be configured through a combination of software modules 1016 loaded during initialization, and further configured by loading or unloading one or more software modules 1016 during operation.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices, and may be referred to herein as computer-readable media and/or processor-readable media. The bus 1010 may also link various other circuits such as timing sources, timers, peripherals, voltage regulators, and power management circuits. A bus interface 1008 may provide an interface between the bus 1010 and one or more transceivers 1012. A transceiver 1012 may be provided for each networking technology supported by the processing circuit. In some instances, multiple networking technologies may share some or all of the circuitry or processing modules found in a transceiver 1012. Each transceiver 1012 provides a means for communicating with various other apparatus over a transmission medium. Depending upon the nature of the apparatus, a user interface 1018 (e.g., keypad, display, speaker, microphone, joystick) may also be provided, and may be communicatively coupled to the bus 1010 directly or through the bus interface 1008.

A processor 1004 may be responsible for managing the bus 1010 and for general processing that may include the execution of software stored in a computer-readable medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement any one of the methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer readable medium. The external computer-readable medium and/or storage 1006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1006 may also include, by way of example, a carrier wave, a transmission line, and any other suitable medium for transmitting software and/or instructions that may be accessed and read by a computer. Computer-readable medium and/or the storage 1006 may reside in the processing circuit 1002, in the processor 1004, external to the processing circuit 1002, or be distributed across multiple entities including the processing circuit 1002. The computer-readable medium and/or storage 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004, and may manage access to external devices such as the transceiver 1012, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to the transceiver 1012, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the transceiver 1012, and device drivers, for example. To support the performance of multiple functions, the one or more processors 1004 may be configured to provide a multitasking environment, whereby each of a plurality of functions is implemented as a set of tasks serviced by the one or more processors 1004 as needed or desired. In one example, the multitasking environment may be implemented using a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

Figure 11:
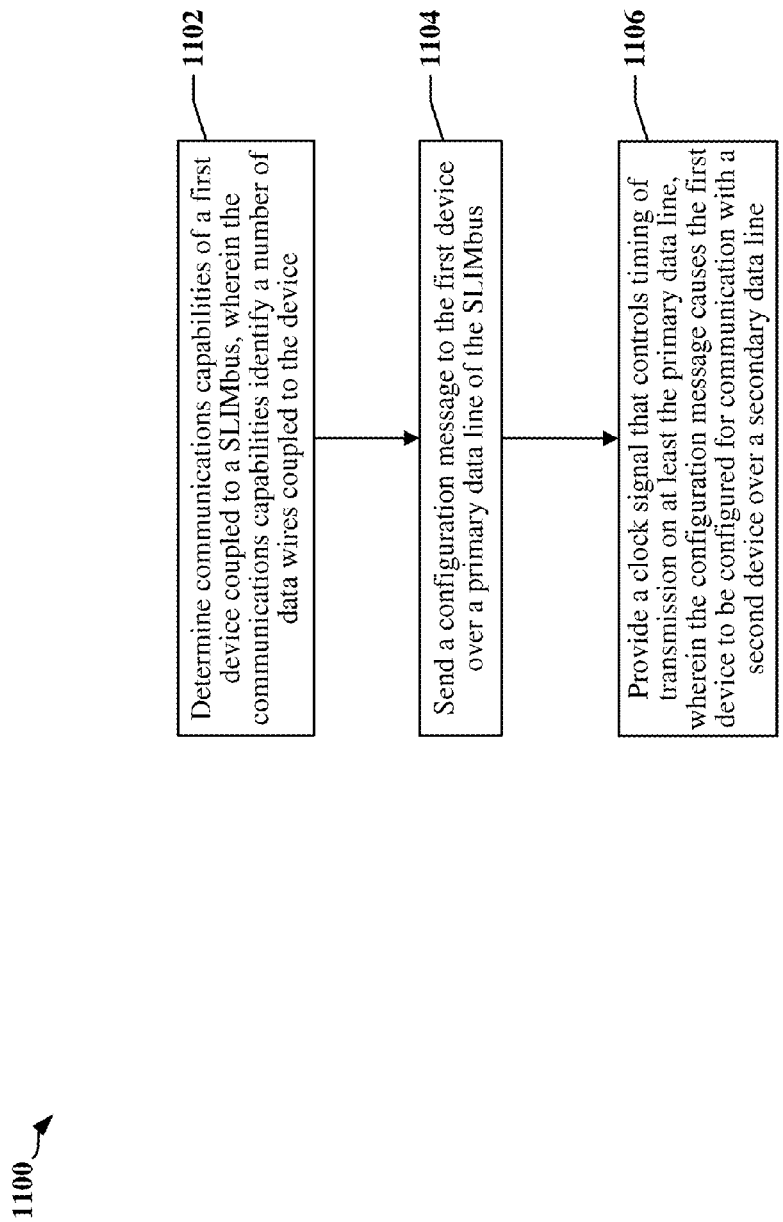
FIG. 11 is a first flow chart illustrating a method for data communications on a SLIMbus according to certain aspects disclosed herein.

FIG. 11 is a flowchart illustrating a communications method according to certain aspects of the invention. The method may be performed by a device 902 that includes a manger circuit or module 926. At step 1102, the device 902 may determine communications capabilities of a first device coupled to a SLIMbus. The communications capabilities may identify a number of data wires coupled to the first device.

At step 1104, the device 902 may send a configuration message and/or a framing message to the first device over a primary data line of the SLIMbus. The configuration message may include control information reserving the secondary data line for communications between the first device and the second device. The secondary data line may be one of a plurality of secondary data lines of the SLIMbus. The control information may be generated by a SLIMbus manager provided on a third device. The third device may be restricted to communicating over the primary data line. In some examples, the control information may be generated by a SLIMbus manager provided on one of the first and second devices. The configuration message may include a framing message.

In an aspect of the disclosure, the configuration message may cause the first device to be configured for communication with a second device over a secondary data line. In one example, the first device may be configured to communicate with the second device using a SLIMbus protocol. In another example, the first device may be configured to communicate with the second device using a non-SLIMbus protocol. The secondary data line may connect the first device with the second device independently of the SLIMbus.

At step 1106, the device 902 may provide a clock signal that controls timing of transmission on at least the primary data line. Communications on the secondary data line may be synchronized using the clock signal.

In an aspect of the disclosure, a plurality of communications channels in time slots on both the primary data line and the secondary data line data may be allocated. The first device may communicate with the second device using one of the plurality of communications channels.

In an aspect of the disclosure, configuration messages sent over the primary data line to a plurality of devices. The reconfiguration command may cause each of the plurality of devices to adopt a configuration in accordance with at least one configuration message. At least one configuration message sent over the primary data line may be addressed to a predefined set of devices.

In an aspect of the disclosure, the first device may be configured to relay at least one configuration message sent over the primary data line to a third device that is not connected to the primary data line.

Figure 12:
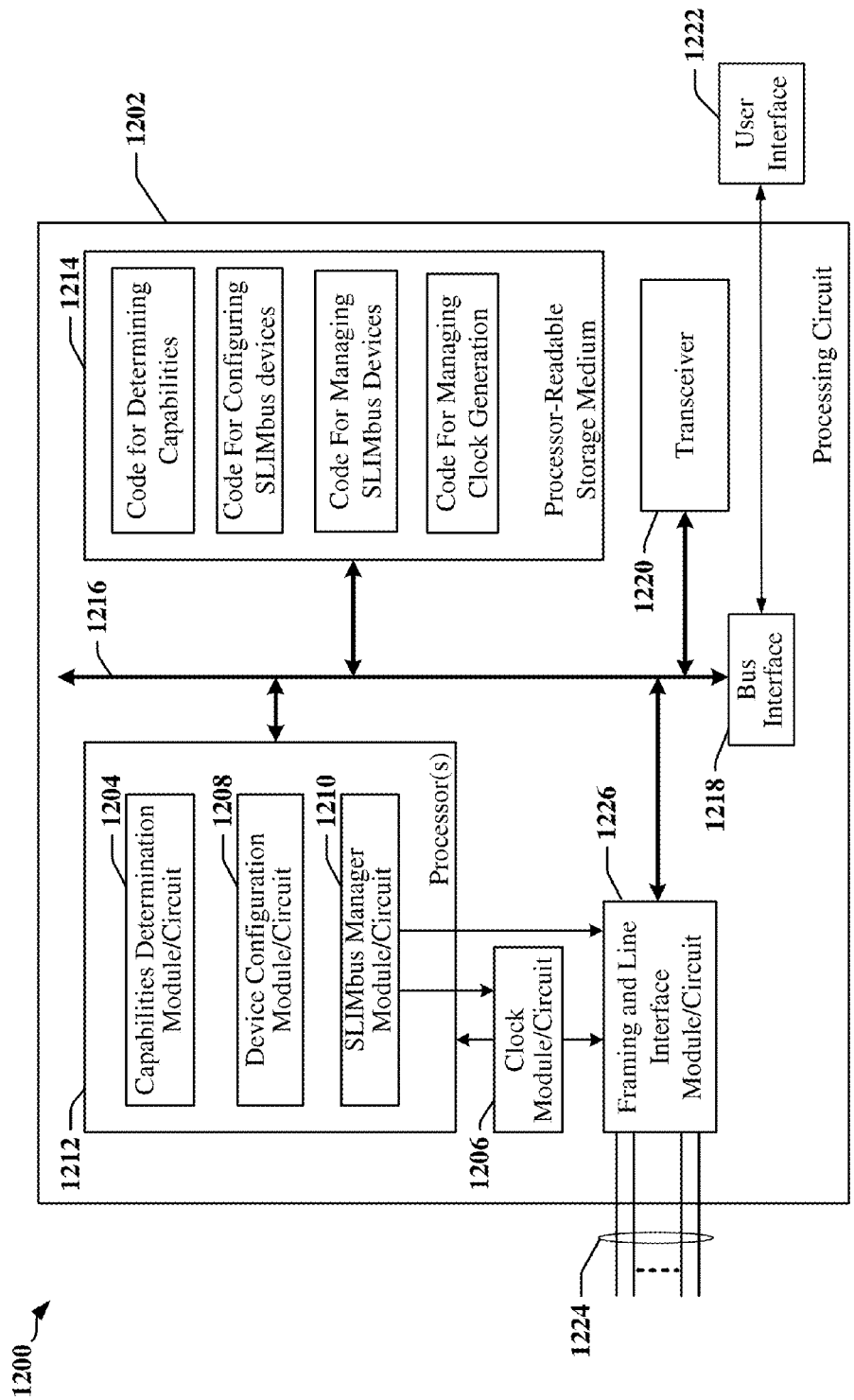
FIG. 12 illustrates an example of an apparatus that can connect to a configurable SLIMbus communications link and perform the method of FIG. 11 in accordance with certain aspects disclosed herein.

FIG. 12 is a conceptual diagram illustrating an example of a hardware implementation for an apparatus 1200 employing a processing circuit 1202. In this example, the processing circuit 1202 may be implemented with a bus architecture, represented generally by the bus 1216. The bus 1216 may include any number of interconnecting buses and bridges depending on the specific application of the processing circuit 1202 and the overall design constraints. The bus 1216 links together various circuits including one or more processors, represented generally by the processor 1212, and computer-readable media, represented generally by the processor-readable storage medium 1214. The bus 1216 may also link various other circuits such as timing sources, timers, peripherals, voltage regulators, and power management circuits. A bus interface 1218 provides an interface between the bus 1216 and a transceiver 1220. The transceiver 1220 may include a bus interface that provides a means for communicating with various other apparatus over a transmission medium. Depending upon the nature of the apparatus, a user interface 1222 (e.g., keypad, display, speaker, microphone, joystick) may also be provided. One or more clock circuits or modules 1206 may be provided within the processing circuit 1202 or controlled by processing circuit 1202 and/or one or more processors 1212. In one example, the clock circuits or modules 1206 may include one or more crystal oscillators, one or more phase-locked loop devices, and/or one or more configurable clock trees.

The processor 1212 is responsible for managing the bus 1216 and general processing, including the execution of software stored on the processor-readable storage medium 1214. The software, when executed by the processor 1212, causes the processing circuit 1202 to perform the various functions described supra for any particular apparatus. The processor-readable storage medium 1214 may be used for storing data that is manipulated by the processor 1212 when executing software.

In one configuration, the apparatus 1200 may be coupled to a SLIMbus 1224 and may include modules or circuits 1204 for determining communications capabilities of other devices coupled to the SLIMbus 1224, modules or circuits 1210, 1226 adapted or configured to send configuration and framing messages to one or more devices over a primary data line of the SLIMbus 1224, and clock generating modules or circuits 1206 that provide a clock signal that controls timing of transmissions on at least the primary data line of the SLIMbus 1224. Configuration and SLIMbus management modules or circuits 1208, 1210 may cooperate to define and/or allocate a plurality of communications channels in time slots on a primary data line and/or a secondary data line of the SLIMbus 1224. In one example, the apparatus 1200 may include interface module and/or circuits 1226 that implements framing and control for the SLIMbus 1224. In some instances, a manager module or circuit may 1210 may control the operation of various circuits and modules 1204, 1206, 1208, and may be responsible for configuring the SLIMbus 1224 and other apparatus connected to the SLIMbus 1224.

Figure 13:
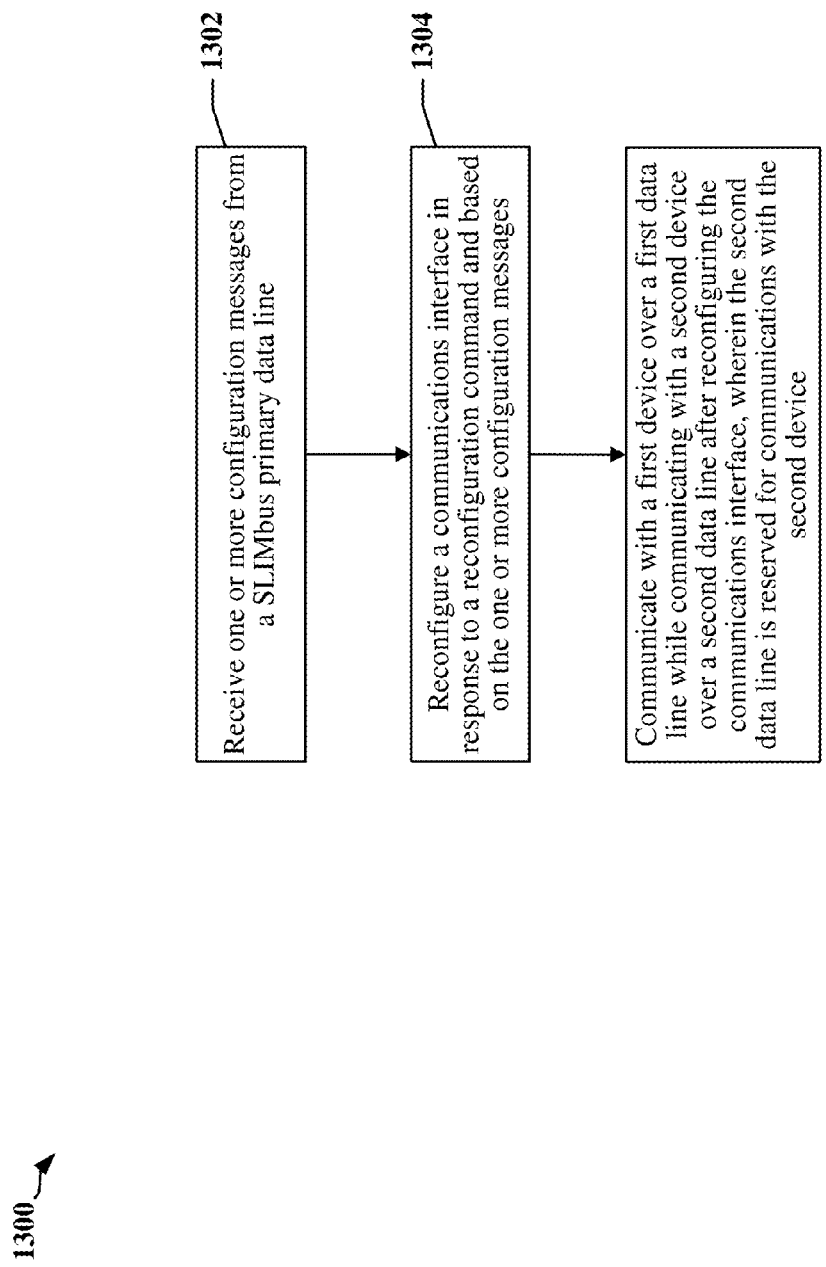
FIG. 13 is a second flow chart illustrating a method for data communications on a SLIMbus according to certain aspects disclosed herein.

FIG. 13 is a flowchart illustrating a communications method according to certain aspects of the invention. The method may be performed by a device 910, 912 that supports communication over a plurality of data lines 932, 934, 936, 940. At step 1302, the device 910, 912 may receive one or more configuration messages from a SLIMbus primary data line.

At step 1304, the device 910, 912 may reconfigure a communications interface in response to a reconfiguration command and based on the one or more configuration messages.

At step 1306, the device 910, 912 may communicate with a first device over a first data line while communicating with a second device over a second data line. The second data line may be reserved for communications with the second device. The first data line may include the SLIMbus primary data line or a SLIMbus secondary data line. The second data line may be a SLIMbus secondary data line that employs a framing and control configuration used by the SLIMbus primary data line. The framing and control configuration may define a root clock frequency. The framing and control configuration may define gearing and is used to calculate a frame boundary. Communications on the second data line may be controlled by a non-SLIMbus protocol.

In an aspect of the disclosure, communications capabilities information may be reported to a manager device. The configuration messages may be generated in response to the communications capabilities information.

Figure 14:
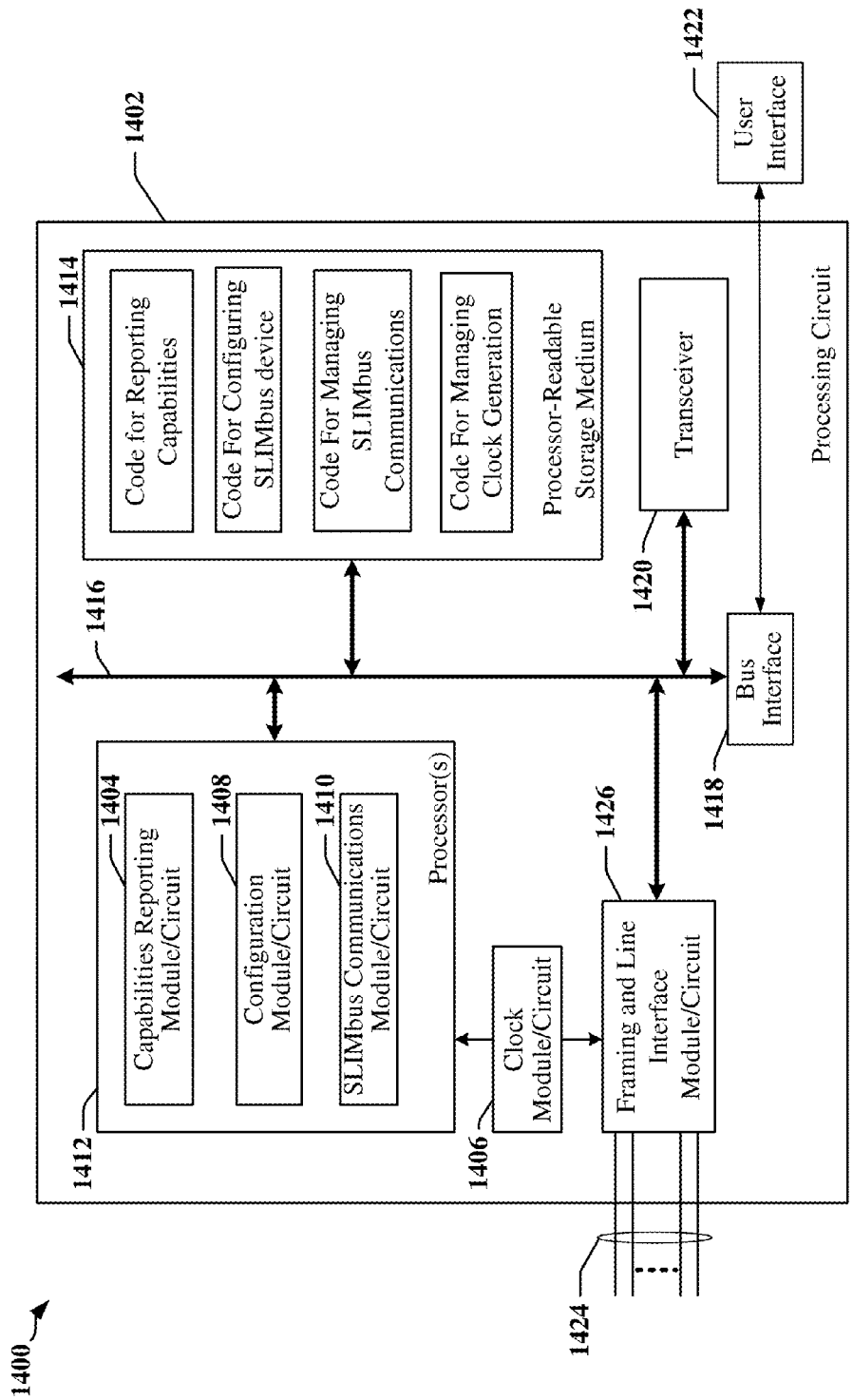
FIG. 14 illustrates an example of an apparatus that can connect to a configurable SLIMbus communications link and perform the method of FIG. 13 in accordance with certain aspects disclosed herein.

FIG. 14 is a conceptual diagram illustrating an example of a hardware implementation for an apparatus 1400 employing a processing circuit 1402. In this example, the processing circuit 1402 may be implemented with a bus architecture, represented generally by the bus 1416. The bus 1416 may include any number of interconnecting buses and bridges depending on the specific application of the processing circuit 1402 and the overall design constraints. The bus 1416 links together various circuits including one or more processors, represented generally by the processor 1412, and computer-readable media, represented generally by the processor-readable storage medium 1414. The bus 1416 may also link various other circuits such as timing sources, timers, peripherals, voltage regulators, and power management circuits. A bus interface 1418 provides an interface between the bus 1416 and a transceiver 1420. The transceiver 1420 may include a bus interface that provides a means for communicating with various other apparatus over a transmission medium. Depending upon the nature of the apparatus, a user interface 1422 (e.g., keypad, display, speaker, microphone, joystick) may also be provided. One or more clock circuits or modules 1406 may be provided within the processing circuit 1402 or controlled by processing circuit 1402 and/or one or more processors 1412. In one example, the clock circuits or modules 1406 may include one or more crystal oscillators, one or more phase-locked loop devices, and/or one or more configurable clock trees.

The processor 1412 is responsible for managing the bus 1416 and general processing, including the execution of software stored on the processor-readable storage medium 1414. The software, when executed by the processor 1412, causes the processing circuit 1402 to perform the various functions described supra for any particular apparatus. The processor-readable storage medium 1414 may be used for storing data that is manipulated by the processor 1412 when executing software.

In one configuration, the apparatus 1400 includes modules or circuits 1404, 1410, 1426 for reporting a configuration including communications capabilities of the apparatus 1400 to a SLIMbus manager, modules or circuits 1410 for receiving one or more configuration messages from a primary data line of a SLIMbus 1424, modules or circuits 1408 for reconfiguring a communications interface 1426, and modules or circuits 1410, 1426 for communicating with a first device over a first data line of the SLIMbus 1424 while communicating with a second device over a second data line of the SLIMbus 1424

The aforementioned means, modules and circuits may be implemented, for example, using some combination of a processor 206 or 236, physical layer drivers 210 or 240 and storage media 208 and 238 illustrated in FIG. 2 and deployed in a network configuration illustrated by FIG. 9.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A communications method, comprising:
    determining communications capabilities of a first device coupled to a serial low-power inter-chip media bus (SLIMbus), wherein the communications capabilities identify a number of data wires coupled to the device including a secondary data line that couples the first device to a second device; and
    sending a configuration message from a third device to the first device over a primary data line of the SLIMbus; and
    providing a clock signal that controls timing of transmission on at least the primary data line,
    wherein the configuration message causes the first device to be configured for communication with the second device over the secondary data line, and
    wherein the configuration message includes control information reserving the secondary data line for communications between the first device and the second device.

2. The method of claim 1, wherein the first device is configured to communicate with the second device over the secondary data line using a SLIMbus protocol.

3. The method of claim 1, wherein the first device is configured to communicate with the second device over the secondary data line using a non-SLIMbus protocol.

4. The method of claim 1, wherein communications on the secondary data line is synchronized using the clock signal.

5. The method of claim 1, further comprising:
    allocating a plurality of communications channels in time slots on both the primary data line and the secondary data line, wherein the first device communicates with the second device over the secondary data line using one of the plurality of communications channels.

6. The method of claim 1, wherein the secondary data line connects the first device with the second device independently of the SLIMbus.

7. The method of claim 1, wherein the secondary data line is one of a plurality of secondary data lines of the SLIMbus.

8. The method of claim 7, wherein the control information is generated by a SLIMbus manager provided on the third device, wherein the third device is restricted to communicating over the primary data line.

9. The method of claim 1, further comprising:
    sending configuration messages over the primary data line to a plurality of devices; and transmitting a reconfiguration command to the plurality of devices,
wherein the reconfiguration command causes each of the plurality of devices to adopt a configuration in accordance with at least one configuration message.

10. The method of claim 9, wherein the first device is configured to relay one or more configuration messages sent over the primary data line to a fourth device.

11. An apparatus, comprising:
a communication interface configured to couple the apparatus to a first device and to a second device through a serial low-power inter-chip media bus (SLIMbus);
a SLIMbus manager; and
a processing circuit configured to:
determine communications capabilities of the first device the SLIMbus, wherein the communications capabilities identify a number of data wires coupled to the first device; and
send a configuration message to the first device over a primary data line of the SLIMbus; and
provide a clock signal that controls timing of transmission on at least the primary data line,
wherein the configuration message causes the first device to be configured for communication with the second device over a secondary data line, and
wherein the configuration message includes control information reserving the secondary data line for communications between the first device and the second device.

12. The apparatus of claim 11, wherein the first device is configured to communicate with the second device using a SLIMbus protocol.

13. The apparatus of claim 11, wherein the first device is configured to communicate with the second device using a non-SLIMbus protocol.

14. The apparatus of claim 11, wherein communications on the secondary data line is synchronized using the clock signal.

15. The apparatus of claim 11, wherein the processing circuit is configured to:
allocate a plurality of communications channels in time slots on both the primary data line and the secondary data line, wherein the first device communicates with the second device using one of the plurality of communications channels.

16. The apparatus of claim 11, wherein the secondary data line connects the first device with the second device independently of the SLIMbus.

17. The apparatus of claim 11, wherein the secondary data line is one of a plurality of secondary data lines of the SLIMbus.

18. The apparatus of claim 17, wherein the control information is generated by the SLIMbus manager, wherein the apparatus is restricted to communicating over the primary data line.

19. The apparatus of claim 11, wherein the processing circuit is configured to:
send configuration messages over the primary data line to a plurality of devices; and
transmit a reconfiguration command to the plurality of devices,
wherein the reconfiguration command causes each of the plurality of devices to adopt a configuration in accordance with at least one configuration message.

20. The apparatus of claim 19, wherein the first device is configured to relay at least one configuration message sent over the primary data line to a third device.

21. A communications method, comprising:
receiving one or more configuration messages from a serial low-power inter-chip media bus (SLIMbus) primary data line;
reconfiguring a communications interface in response to a reconfiguration command and based on the one or more configuration messages; and
communicating with a first device over a first data line while communicating with a second device over a second data line after reconfiguring the communications interface,
communicating with a first device over a first data line while communicating with a second device over a second data line after reconfiguring the communications interface,
wherein the second data line is reserved for communications with the second device,
wherein the reconfiguration command is received from the first device, and
wherein the first device is restricted from communicating over the second data line.

22. The method of claim 21, wherein the first data line comprises the SLIMbus primary data line or a SLIMbus secondary data line.

23. The method of claim 21, wherein the second data line comprises a SLIMbus secondary data line that employs a framing and control configuration used by the SLIMbus primary data line, and wherein the framing and control configuration defines a root clock frequency and gearing and is used to calculate a frame boundary.

24. The method of claim 21, wherein communications on the second data line is controlled by a non-SLIMbus protocol.

25. The method of claim 21, further comprising:
reporting communications capabilities information to a manager in the first device, wherein the configuration messages are generated in response to the communications capabilities information.

26. An apparatus, comprising:
a processing circuit configured to:
receive one or more configuration messages from a serial low-power inter-chip media bus (SLIMbus) primary data line;
reconfigure a communications interface in response to a reconfiguration command and based on the one or more configuration messages; and
communicate with a first device over a first data line while communicating with a second device over a second data line after the communications interface is reconfigured,
wherein the second data line is reserved for communications with the second device,
wherein the reconfiguration command is received from the first device, and
wherein the first device is restricted from communicating over the second data line.

27. The apparatus of claim 26, wherein the first data line comprises the SLIMbus primary data line or a SLIMbus secondary data line.

28. The apparatus of claim 26, wherein the second data line comprises a SLIMbus secondary data line that employs a framing and control configuration used by the SLIMbus primary data line, and wherein the framing and control configuration defines a root clock frequency and gearing and is used to calculate a frame boundary.

29. The apparatus of claim 26, wherein communications on the second data line is controlled by a non-SLIMbus protocol.

30. The apparatus of claim 26, wherein the processing circuit is configured to:
   report communications capabilities information to a manager in the first device, wherein the configuration messages are generated in response to the communications capabilities information.

* * * * *